SCAN CONTROL 4SCN

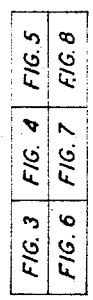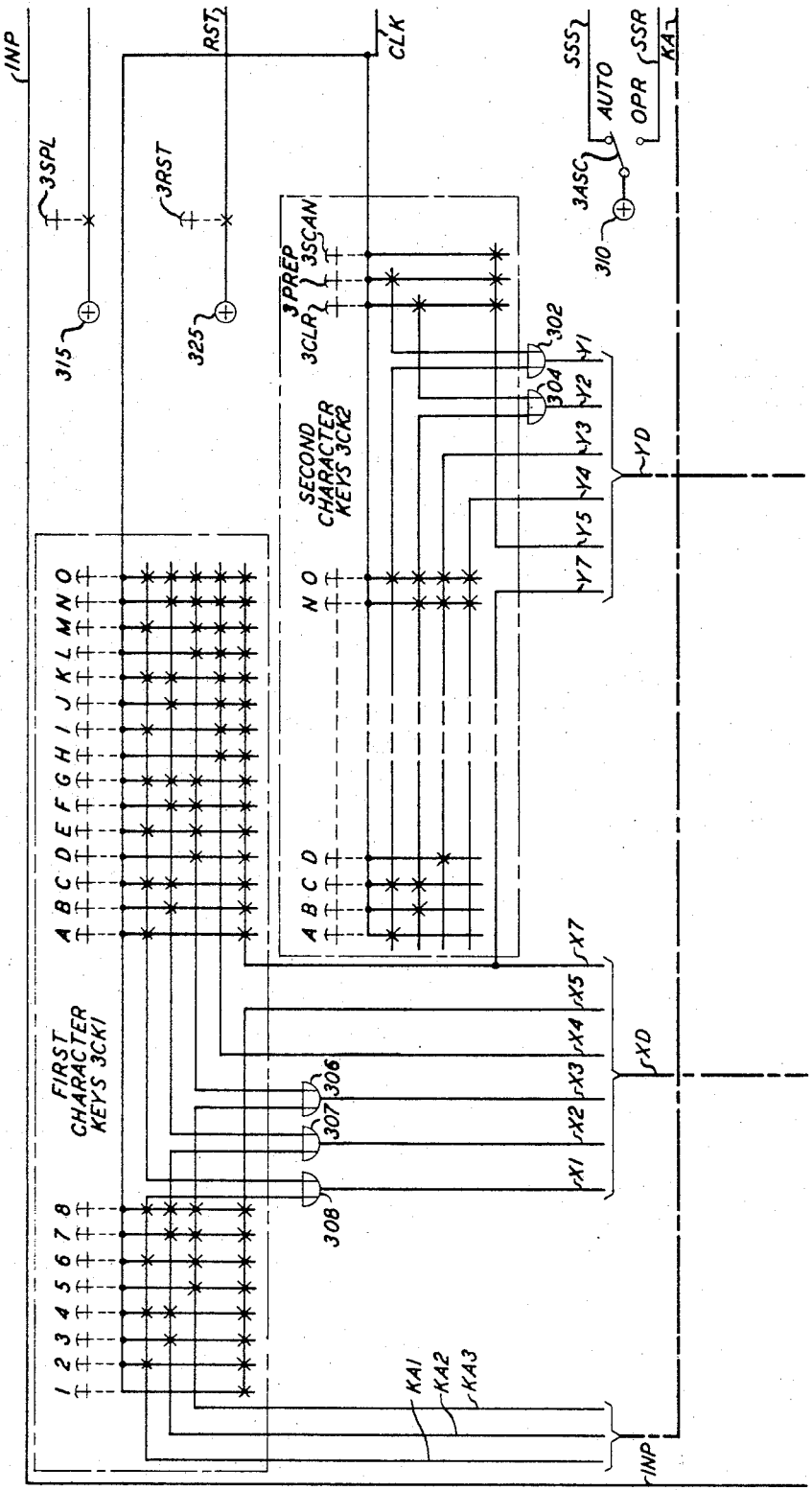
FIG. 3
CONTROL CONSOLE 3CON

FIG. 11 SHIFT REGISTER IOSR

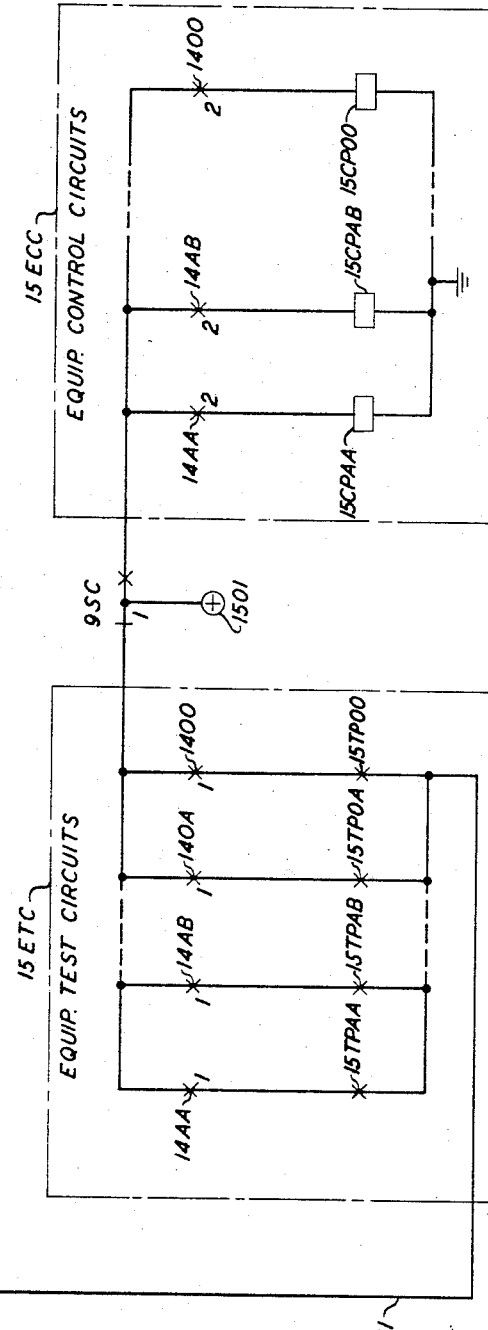

United States Patent Office 3,435,416
Patented Mar. 25, 1969

3,435,416
MONITORING AND CONTROL SYSTEM
Kenneth P. Kretsch, Middletown, and Edward F. Lyons, Franklin Township, Somerset County, N.J., assignors to Bell Telephone Laboratories, Incorporated, New York, N.Y., a corporation of New York
Filed Oct. 29, 1964, Ser. No. 407,340
Int. Cl. H04q 9/02
U.S. Cl. 340—163     15 Claims

ABSTRACT OF THE DISCLOSURE

In a condition monitoring and control system, a plurality of remote stations are individually selected for monitoring or control by a central station. Upon receipt of a command from the central station, scanning circuitry at a selected remote station monitors the status of a plurality of test points, and alarm circuitry signals the location of any malfunctions back to the central station. To effect control, the same remote station scanning circuitry is used to direct a control instruction to the test point where corrective action is desired.

---

This invention relates to an alarm monitoring and control system and, more specifically, to an alarm monitoring and control system for supervising a plurality of remote unattended stations from a single attended station.

In many fields, and particularly in the communications field, numerous items of equipment are often located at various stations geographically distributed over a wide area, such as at repeater stations, relay stations, switching offices, and the like. The placement of one or more attendants at each of these stations to observe and correct any faults which may occur in the equipment thereat is usually not feasible. Accordingly, various arrangements have been developed in the art to permit supervision of a plurality of remotely located, unattended stations by personnel situated at a single attended station. These known arrangements have proved generally satisfactory in operation; however, they have exhibited one or more disadvantages related to the complexity, size and cost of the equipment required, the degree of training necessary for the attending personnel, and the level of automatic supervision and control provided.

The present invention, therefore, has as a general object the provision of a new and improved alarm monitoring and control system.

More particularly, it is an object of this invention to provide a simple, compact, and economical arrangement for supervising a plurality of unattended stations from a single attended station, which arrangement is reliable and simple to operate and maintain.

A further object of the present invention is to provide an alarm monitoring and control system for supervising a plurality of unattended stations from a single attended station, which system requires a minimum of circuitry individual to each unattended station.

Another object of this invention is to provide an automatic arrangement for periodically interrogating pluralities of equipment test points at a number of remote, unattended stations and for displaying visual supervisory indications for each test point at a single attended station.

Yet another object of this invention is to provide a simple, compact, and economical alarm monitoring and control system for automatically displaying alarms from a plurality of remote stations at a central station and for selectively controlling from the central station the operation of equipment located at the remote stations.

The above and other objects are attained in an illustrative embodiment of the present invention wherein unattended equipments at a plurality of remote stations are monitored and controlled over a common communications link from a central station. The individual remote stations are periodically interrogated in sequence for monitoring purposes by automatic circuitry at the central station; and for equipment control purposes, the individual stations and particular equipments thereat are selectively addressed by operator controlled circitry at the central station. Responsive to commands from the central station, scanning circuitry at the individual remote stations is employed both for automatically monitoring a plurality of equipment test points at the remote station and also for selection and energization of equipment control apparatus at the remote station.

In accordance with one aspect of the present invention, the equipment test points or circuits at a remote station are individually associated with respective crosspoints of a matrix, and monitoring operation is effected by circuitry for sequentially scanning the matrix crosspoints to detect predetermined conditions such as alarms. Upon detection of an alarm condition at a test point, the remote station temporarily interrupts scanning long enough to transmit an encoded notation to the central station identifying the particular test point presenting the alarm condition. The test point identity is derived advantageously from the scanning circuitry, eliminating any need for additional circuitry for this purpose. At the central location the alarm is received, decoded and displayed to an operator for analysis.

In accordance with another aspect of the present invention, each equipment control apparatus at the remote station is individually associated with a respective crosspoint of the above-mentioned matrix, and the circuitry employed during monitoring operation for sequentially scanning the equipment test points is also utilized for control purposes to select a particular equipment control apparatus to be energized for corrective action. During remote control operation the matrix scanning circuitry is advanced until it contains the identity of the desired equipment control apparatus which is transmitted from the central station. An error check is performed under control of the operator at the central station before the selected equipment control apparatus is energized to ensure that the corrective action is being taken with respect to the proper equipment control apparatus.

It is therefore a feature of the present invention that a monitoring and control system comprise common scanning circuitry operable both for continuous monitoring of a plurality of test points and for intermittent selection and energization of individual control apparatus.

A further feature of the present invention relates to a matrix in a monitoring and control system having the individual crosspoints of the matrix each associated with a respective test point and a respective control apparatus and to circuitry for actuating the matrix crosspoints sequentially for monitoring purposes and selectively for control purposes.

Another feature of our invention relates to common circuitry in an alarm monitoring and control system for receiving and transmitting both alarm and control apparatus identities.

The foregoing and other objects and features of the invention may be fully apprehended upon consideration of the following detailed description and the accompanying drawing, in which:

FIGS. 1 and 2, when FIG. 1 is arranged at the left of FIG. 2, comprise a block diagram representation of an alarm monitoring and control system in accordance with the principles of the present invention;

FIGS. 3 through 8 comprise a schematic diagram of a specific illustrative embodiment of an attended station in an alarm monitoring and control system in accordance with the present invention;

FIGS. 9 through 15 comprise a schematic diagram of a specific illustrative embodiment of an unattended station in an alarm monitoring and control system in accordance with the present invention;

FIG. 16 shows the arrangement of FIGS. 3 through 8; and

FIG. 17 shows the arrangement of FIGS. 9 through 15.

GENERAL DESCRIPTION

Figure 1:
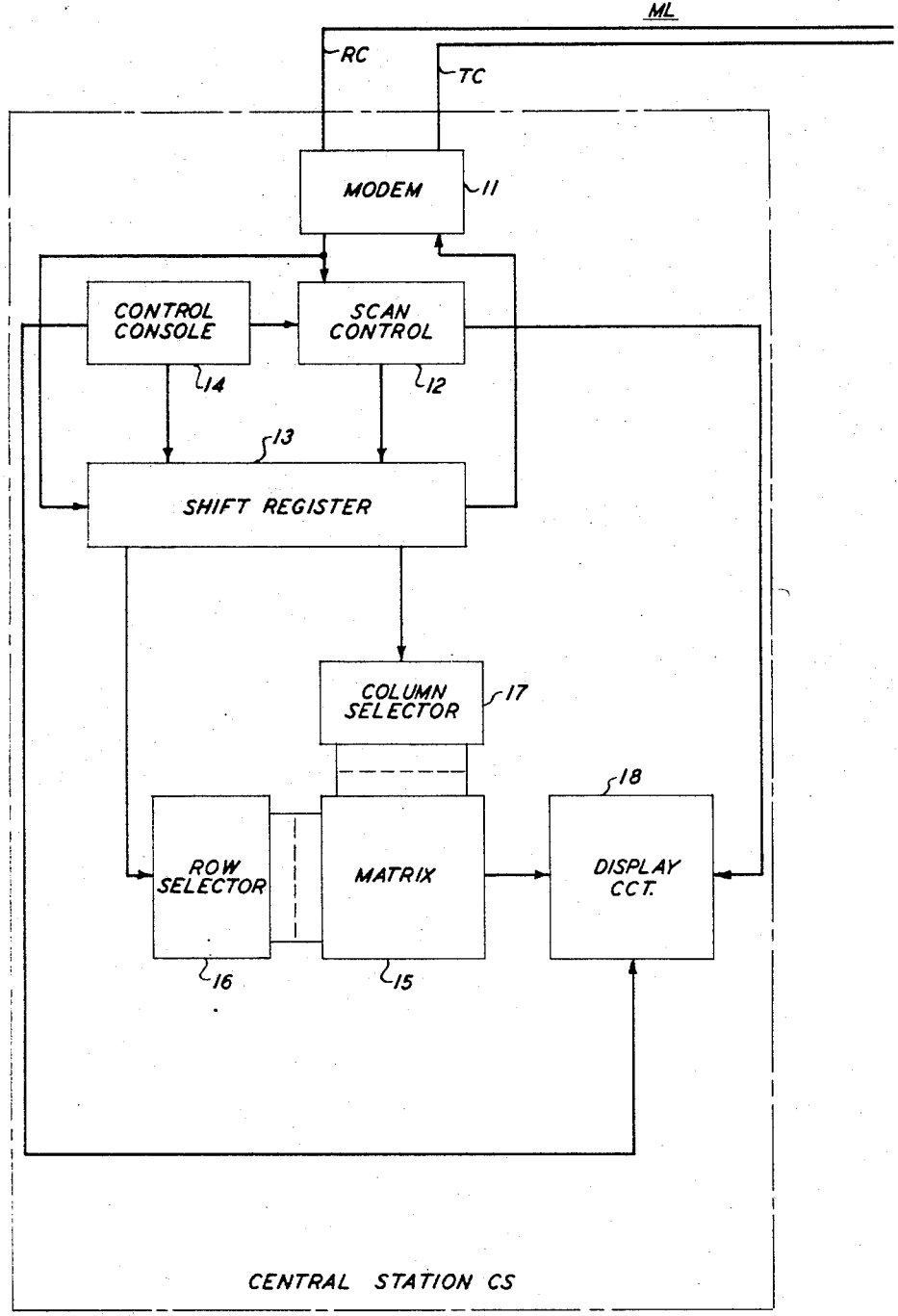
Figure 2:
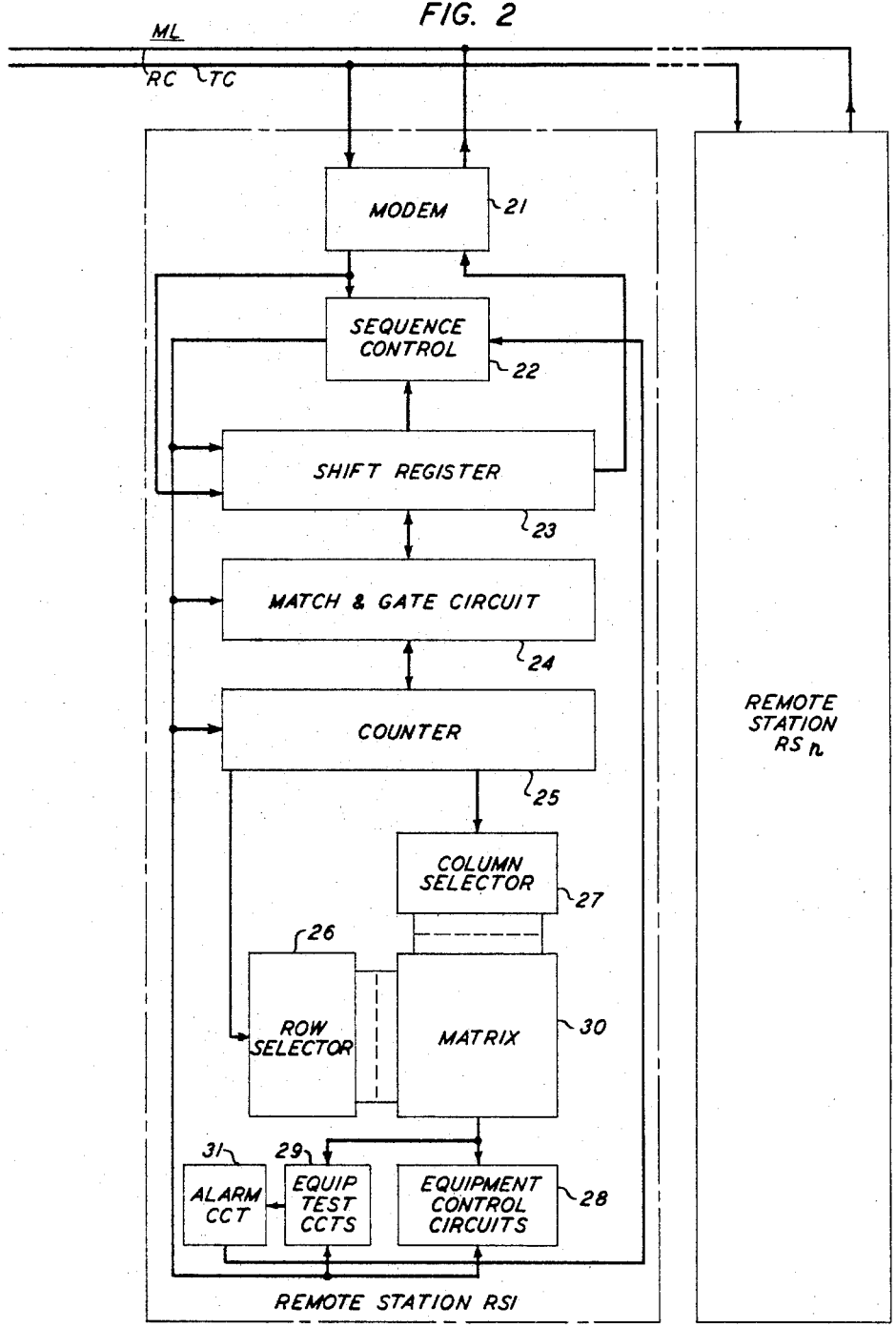
Figure 4:
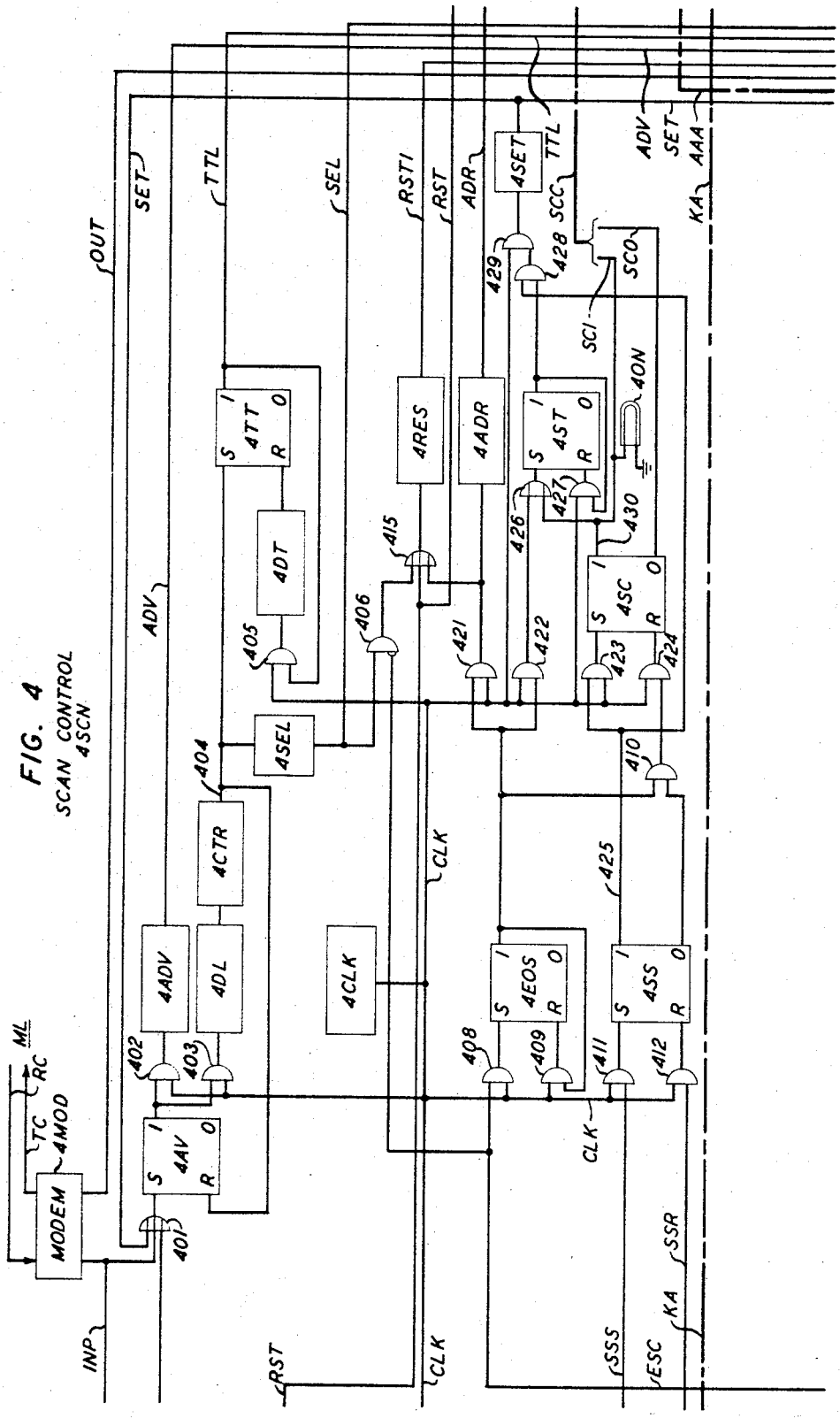
Figure 5:
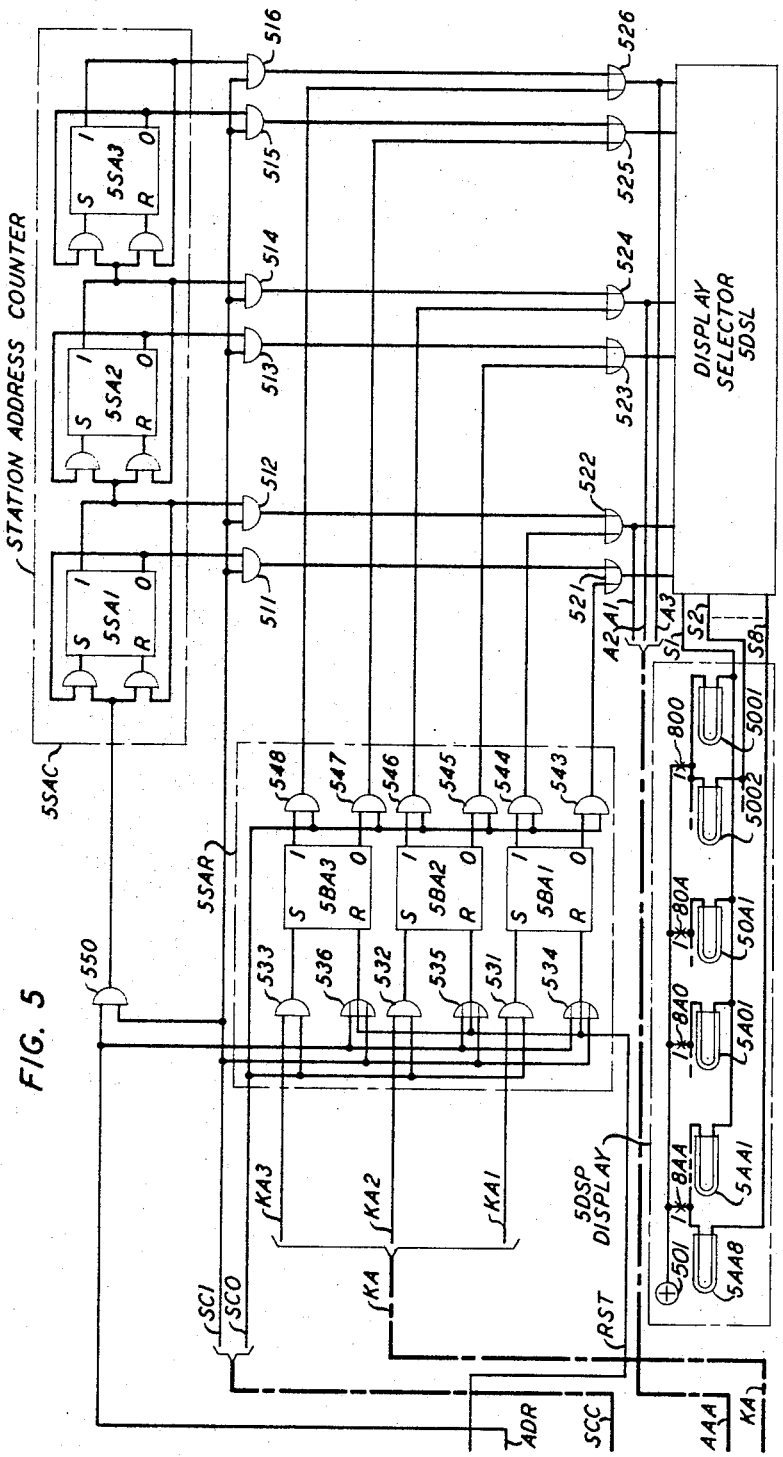
Figure 6:
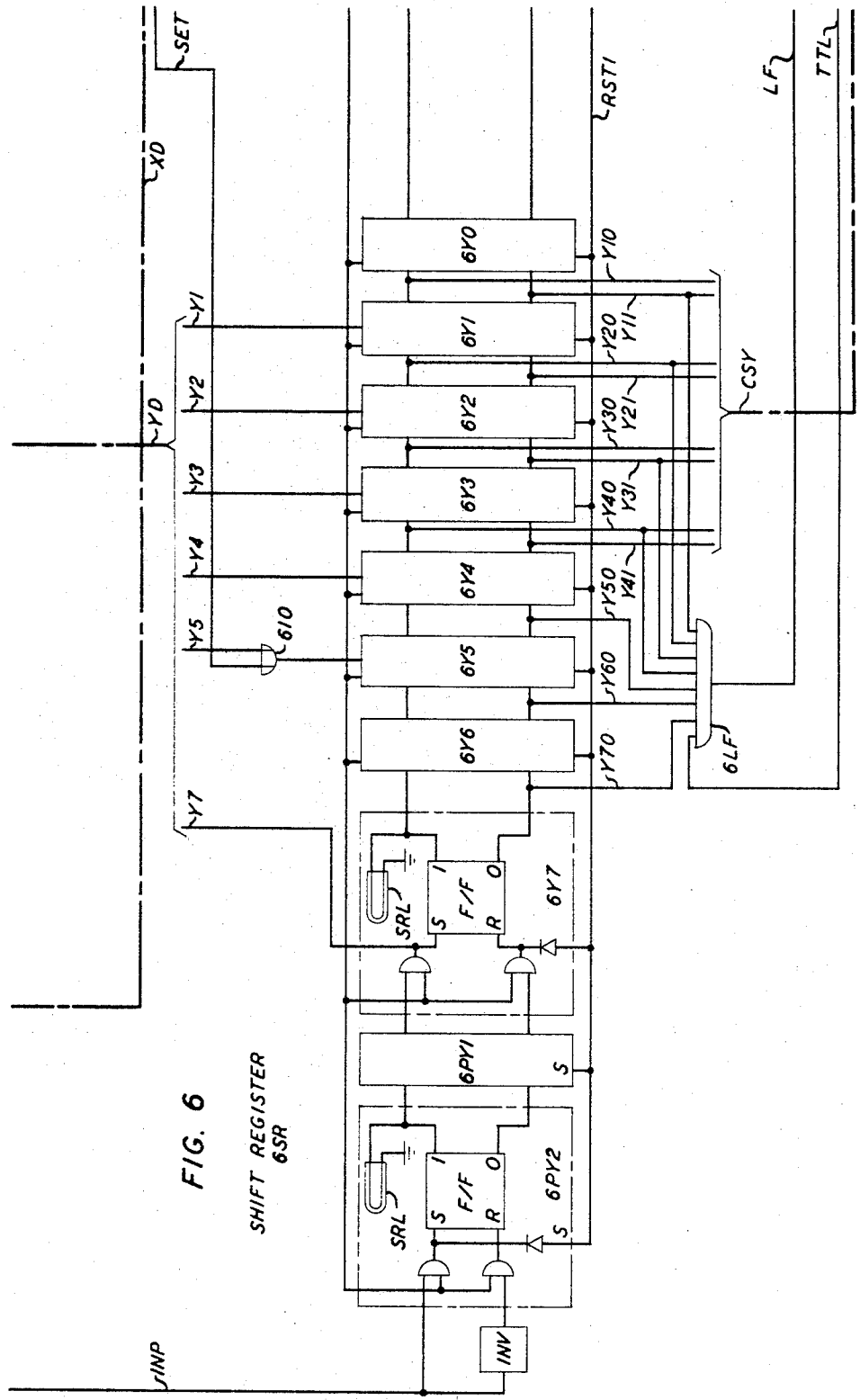
Figure 7:
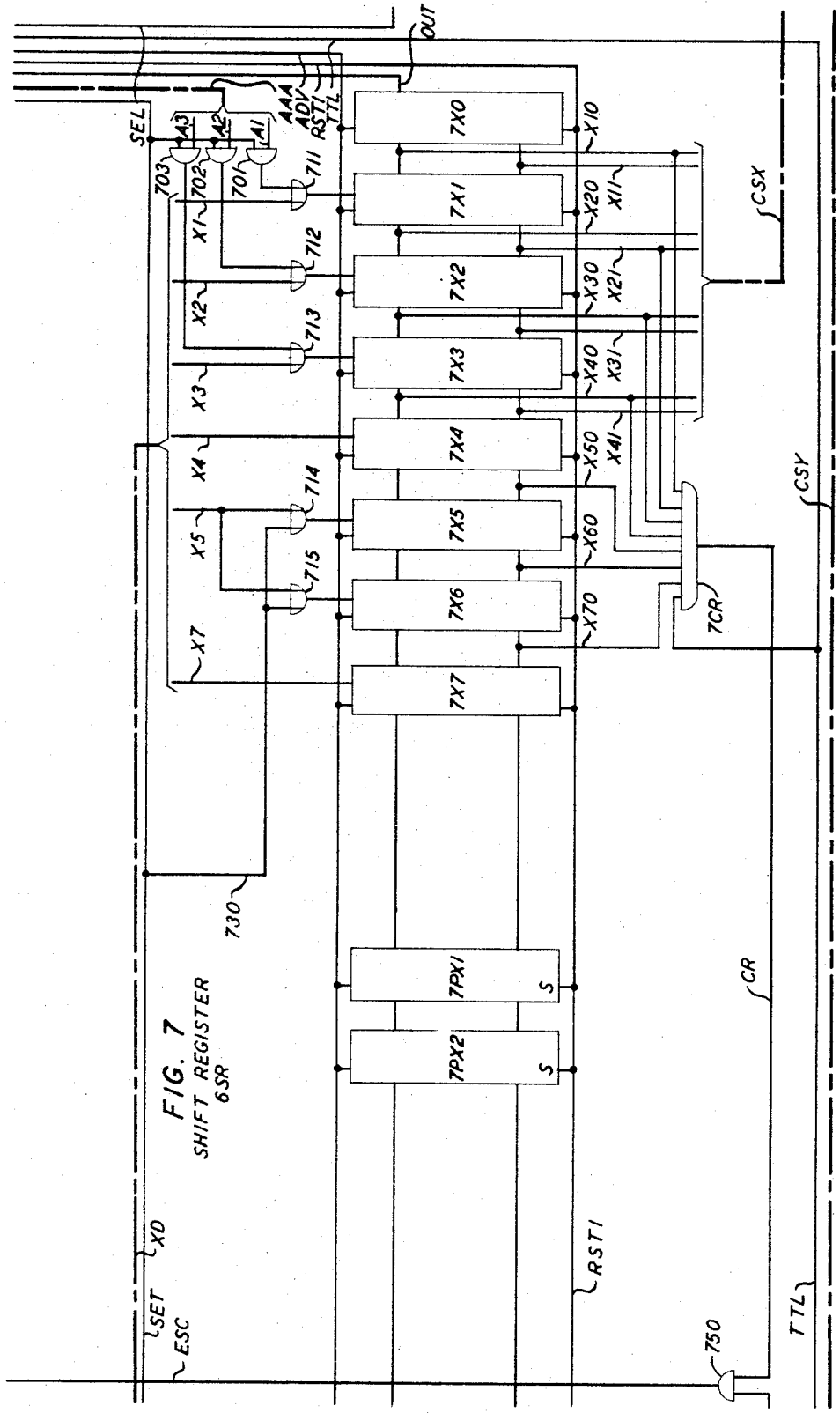

Referring to FIGS. 1 and 2, with FIG. 1 arranged to the left of FIG. 2, a block diagram of an alarm monitoring and control system is shown following the principles of the present invention and comprising a plurality of unattended remote stations RS1 through RS$n$ connected over communications link ML to a single attended central station CS. Communications link ML includes transmit channel TC and receive channel RC and may be assumed herein for the purposes of illustration to comprise a four-wire transmission line. However, it will be apparent that with suitable transmitting and receiving facilities any other known form of communications link may be employed readily in the present alarm and control system.

Central station CS comprises scan control 12 and control console 14 for automatically controlling the periodic interrogation of pluralities of equipment test circuits at each of remote stations RS1 through RS$n$ and for selectively addressing and energizing, under control of an operator, individual equipment control circuits at the remote stations. Shift register 13 is employed to store all information which is to be transmitted from central station CS over transmit channel TC to the remote stations. All signals received on receive channel RC from the remote stations are, after being decoded by modem 11, stored also in shift register 13. The latter signals include supervisory or alarm indications from individual ones of the remote stations, which indications are operative through row and column selectors 16 and 17 and matrix 15 to provide automatically at display circuit 18 a visual display to an operator for analysis.

Each of remote stations RS1 through RS$n$ is substantially similar in structure and operation, and thus only remote station RS1 is shown in any detail in the drawing. The operation of each remote station is controlled by wired logic in a sequence control circuit, such as sequence control 22 at remote station RS1, which is responsive in operation to signals received over transmit channel TC from central station CS. All signals received on transmit channel TC are, after being decoded by modem 21, stored in shift register 23. Shift register 23 is also employed, as will be described in detail hereinbelow, to store all information which is to be transmitted from the remote station over receive channel RC to central station CS.

At each remote station the operation of various equipments is to be monitored and controlled by an attendant located at central station CS. For monitoring purposes a plurality of equipment test circuits 29 are individually associated with respective crosspoints in matrix 30. For equipment control purposes a plurality of equipment control circuits 28 are also individually associated with the respective crosspoints in matrix 30. Matrix 30 is actuated by counter 25 through row and column selectors 26 and 27 to operate in either of two modes, a scan mode or a control mode.

The mode of operation for each remote station is controlled from central station CS. The scan mode is an automatic operation while the control mode is under the direction of an operator at central station CS. Scan control 12 at central station CS functions automatically, without the intervention of an attendant, to periodically interrogate each of remote stations RS1 through RS$n$ in sequence to monitor equipment theerat via the equipment test circuits. To initiate monitoring, that is the scan mode of operation, scan control 12 places the identity of remote station RS1 and a scan instruction in shift register 13 from which it is directed serially through modem 11 for transmission over transmit channel TC. Every signal transmitted by central station CS over channel TC is received by each of remote stations RS1 through RS$n$ and is stored temporarily in the respective shift registers thereat. Each of remote stations RS1 through RS$n$ normally resides in an idle receive condition, searching each transmission from central station CS for its own station identity and, responsive to the detection thereof, executes the accompanying instruction. Thus, when the identity of remote station RS1 and the accompanying scan instruction appear on transmit channel TC and are registered in shift register 23, sequence control 22 recognizes the identity of remote station RS1 and, responsive thereto and to the scan instruction, initiates the scan mode of operation at remote station RS1.

In the scan mode of operation counter 25 is energized by sequence control 22 to advance through its successive states, thereby actuating the individual crosspoints of matrix 30 sequentially through row and column selectors 26 and 27 to scan the associated ones of equipment test circuits 29. In the absence of an alarm condition at any of the plurality of equipment test circuits 29, upon completion of the scan sequence control 22 directs an end-of-scan signal to shift register 23. The end-of-scan signal is read out of shift register 23 through modem 21 and over receive channel RC to central station CS. Remote station RS1 then restores itself to an idle condition and scan control 12 at signal station CS, responsive to the end-of-scan signal from remote station RS1, places the identity of the next remote station to be interrogated in shift register 13. Each remote station is interrogated automatically in this manner to scan the equipment test circuits thereat for alarm conditions, and then the cycle repeats, starting again with remote station RS1.

Should any equipment test circuit exhibit an alarm condition during scanning thereof, the scan mode of operation is temporarily interrupted long enough for the remote station to transmit the identity of the particular equipment test circuit to central station CS. Assume, for example, that one of equipment test circuits 29 at remote station RS1 exhibits an alarm condition during the scan mode of operation at remote station RS1. When counter 25 advances during scanning operation to actuate the crosspoint in matrix 30 associated with the equipment test circuit exhibiting the alarm condition, an alarm signal is provided by alarm circuit 31 to sequence control 22. The contents of counter 25, the state of which provides an indication of the identity of the particular equipment test circuit exhibiting the alarm condition, are directed to shift register 23. Sequence control 22 directs the read out thereof from shift register 23 through modem 21 over receive channel RC to central station CS. When read out of shift register 23 is completed, sequence control 22 resumes the scan again where it left off and continues through the remaining ones of equipment test circuits 29 at remote station RS1.

The identity of the equipment test circuit exhibiting the alarm condition at remote station RS1 is thus received at central station CS and registered in shift register 13. As mentioned above, alarm indications registered during the scan mode of operation in shift register 13 are directed through row and column selectors 16 and 17 to actuate a corresponding individual crosspoint in matrix 15, and thus to provide a visual indication at display circuit 18 of the identity of the equipment test circuit presenting the alarm condition. Scan control 12 provides an indication to display circuit 18 identifying the particular remote station from which the alarm condition derived.

Upon analysis of the alarm display, an operator at station CS can initiate suitable corrective action via control console 14. Such action can be taken at the termination of scanning of any one of remote stations RS1 through RSn and need not be delayed until all of the remote stations have been interrogated. To initiate the control mode of operation for correcting the alarm condition at remote station RS1, control console 14 is employed by the operator to interrupt the scan mode of operation and to place the identity of remote RS1 and a preparatory command instruction into shift register 13. The contents of shift register 13 are read out by scan control 12 through modem 11 over transmit channel TC to the shift registers at each of remote stations RS1 through RSn. Sequence control 22 recognizes the identity of remote station RS1 and, responsive to the accompanying preparatory command instruction, places remote station RS1 in the control mode of operation, ready to execute a subsequent control instruction from central station CS.

The operator at central station CS then proceeds via control console 14 to place into shift register 13 the identity of the particular one of equipment control circuits 28 at remote station RS1, which is to be energized to effect the desired corrective action. The equipment control circuit identity is transmitted from shift register 13 over transmit channel TC to each of remote stations RS1 through RSn. However, only remote station RS1 has been prepared by the preceding preparatory command instruction to enable it to interpret the equipment control circuit identity as a control instruction and to respond thereto. Thus, sequence control 22, responsive to registration in shift register 23 of the equipment control circuit identity, energizes counter 25 to advance through its successive states until the contents of counter 25 match the contents of shift register 23. Such a match is determined by match and gate circuit 24, which thereupon interrupts the advance of counter 25, counter 25 therefore containing at this point the address of the crosspoint in matrix 30 associated with the particular one of equipment control circuits 28 which is to be energized.

Before energizing the selected equipment control circuit, an identity error check is performed to ensure that the correct equipment control circuit 28 has been selected. For this purpose, upon receiving a match indication from match and gate circuit 24, the state of counter 25 is registered in shift register 23 and read out through modem 21 over receive channel RC back to central station CS and into shift register 13. The operator at central station CS checks the contents of shift register 13 and, if the correct equipment control circuit identity is contained therein, effects read out of the identity from shift register 13 as a control instruction back over transmit channel TC to shift register 23 at remote station RS1. Match and gate circuit 24 indicates an immediate match of the identity with the state of counter 25 and, responsive thereto, sequence control 22 energizes the particular equipment control circuit 28 previously selected by counter 25 through matrix 30.

The contents of shift register 23 may then be read out again over receive channel RC to central station CS as an indication that the desired corrective action has been taken; or the operator at the central station may selectively initiate a scan of the equipment test circuits at the particular remote station RS1 to determine that the alarm condition has been alleviated. The operator may initiate further corrective action with respect to other equipment control circuits at remote station RS1 or at other remote stations in the same manner in accordance with his analysis of alarm conditions at display circuit 18. The operator may also, at any point, return the system to the scan mode of operation to continue the automatic interrogation of remote stations RS1 through RSn.

In brief summary, therefore, a simple, compact, and economical arrangement is provided for automatically interrogating pluralities of equipment alarm test circuits at a number of unattended, remote stations periodically, for visually displaying alarm indications for each test circuit at a single attended central station, and for selectively controlling from the central station the operation of equipments located at the individual remote stations, which arrangement advantageously employs common circuitry at each remote station operable both for periodic monitoring of the alarm test circuits and for intermittent selection and energization of circuits controlling the operation of the equipments at the remote station. A more complete and comprehensive description of a specific illustrative embodiment in accordance with the principles of the present invention will be found hereinbelow in the detailed description of the schematic diagrams of an attended central station, depicted in FIGS. 3 through 8, and of an unattended remote station, depicted in FIGS. 9 through 15.

DETAILED DESCRIPTION

Figure 8:
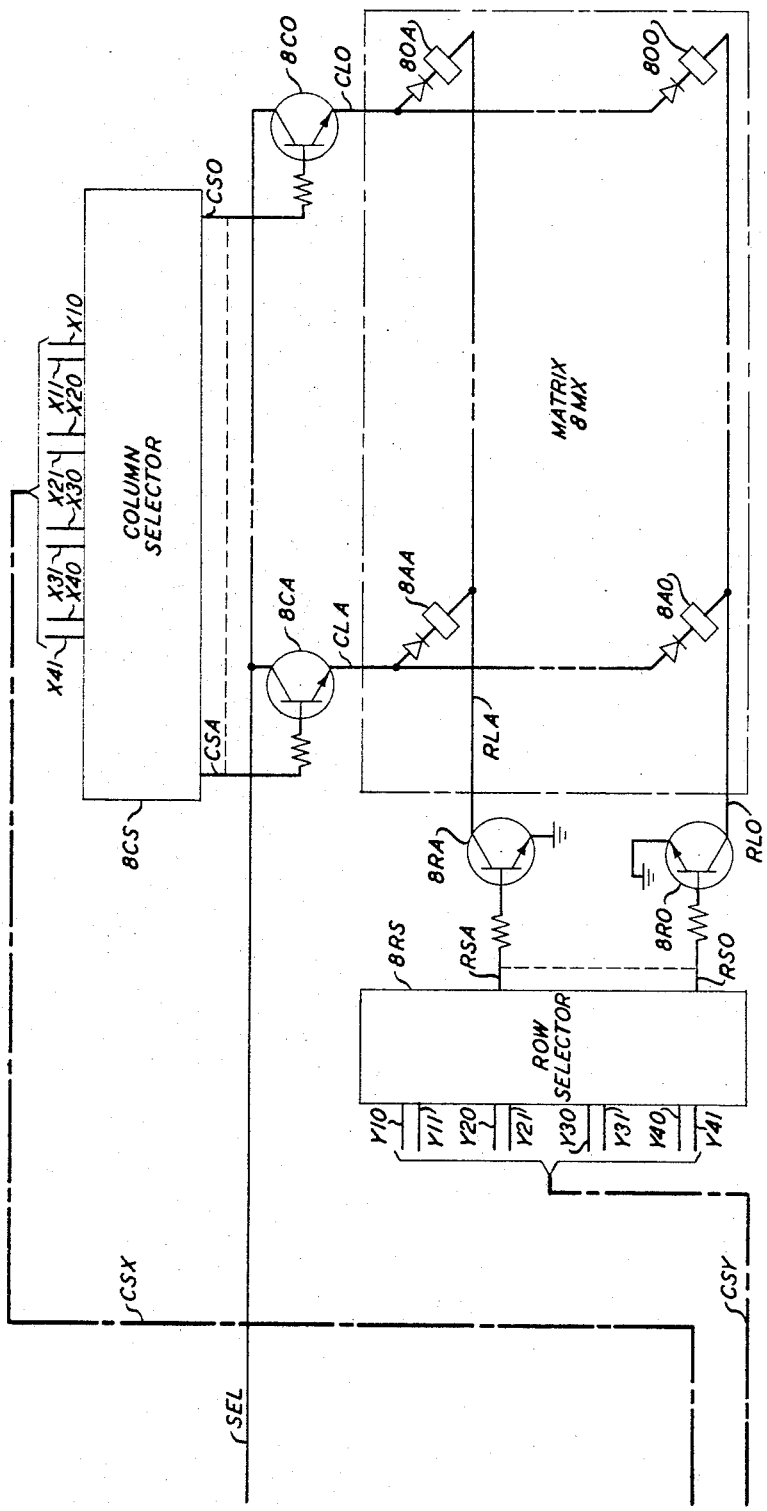
Figure 9:
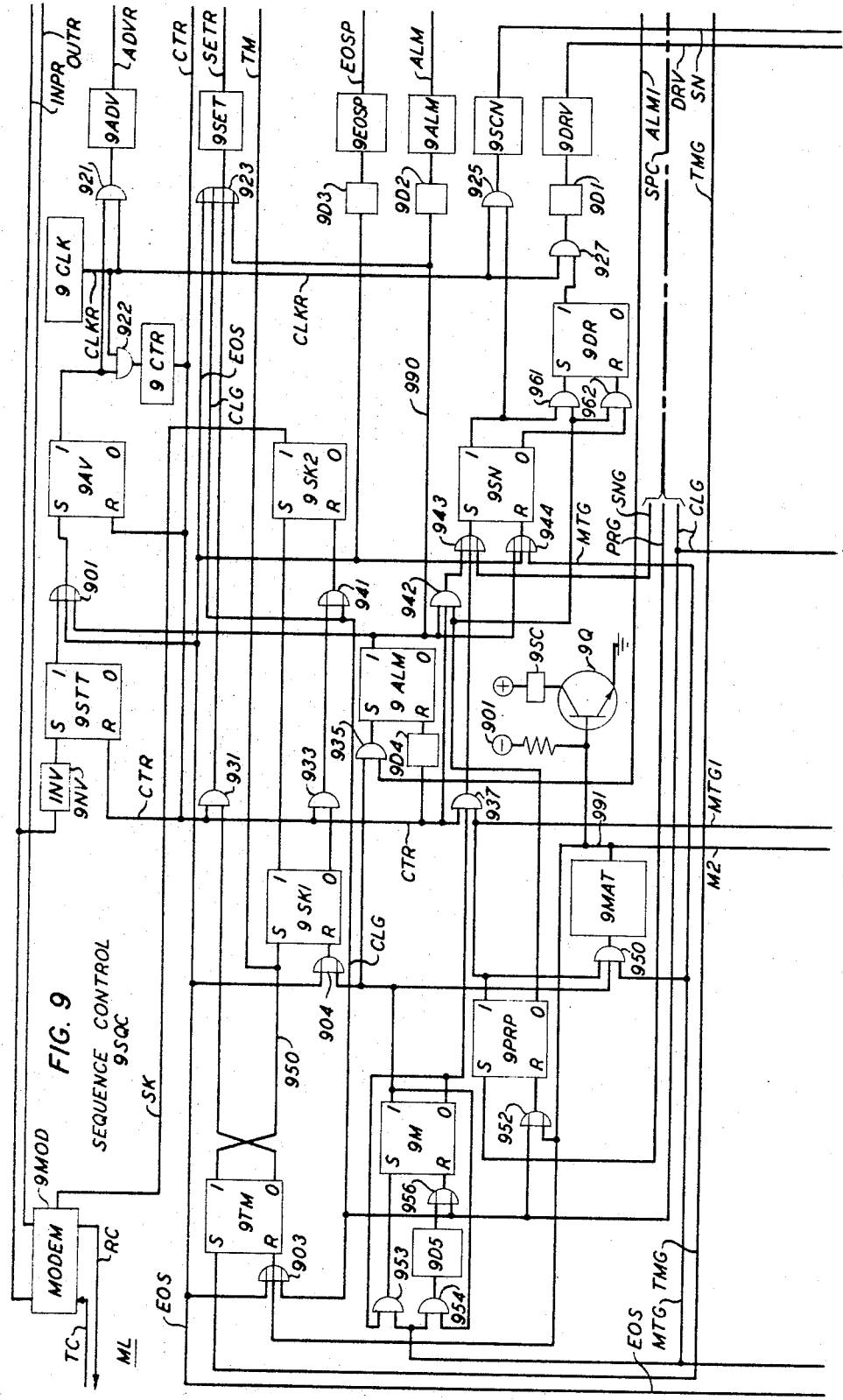
Figure 10:
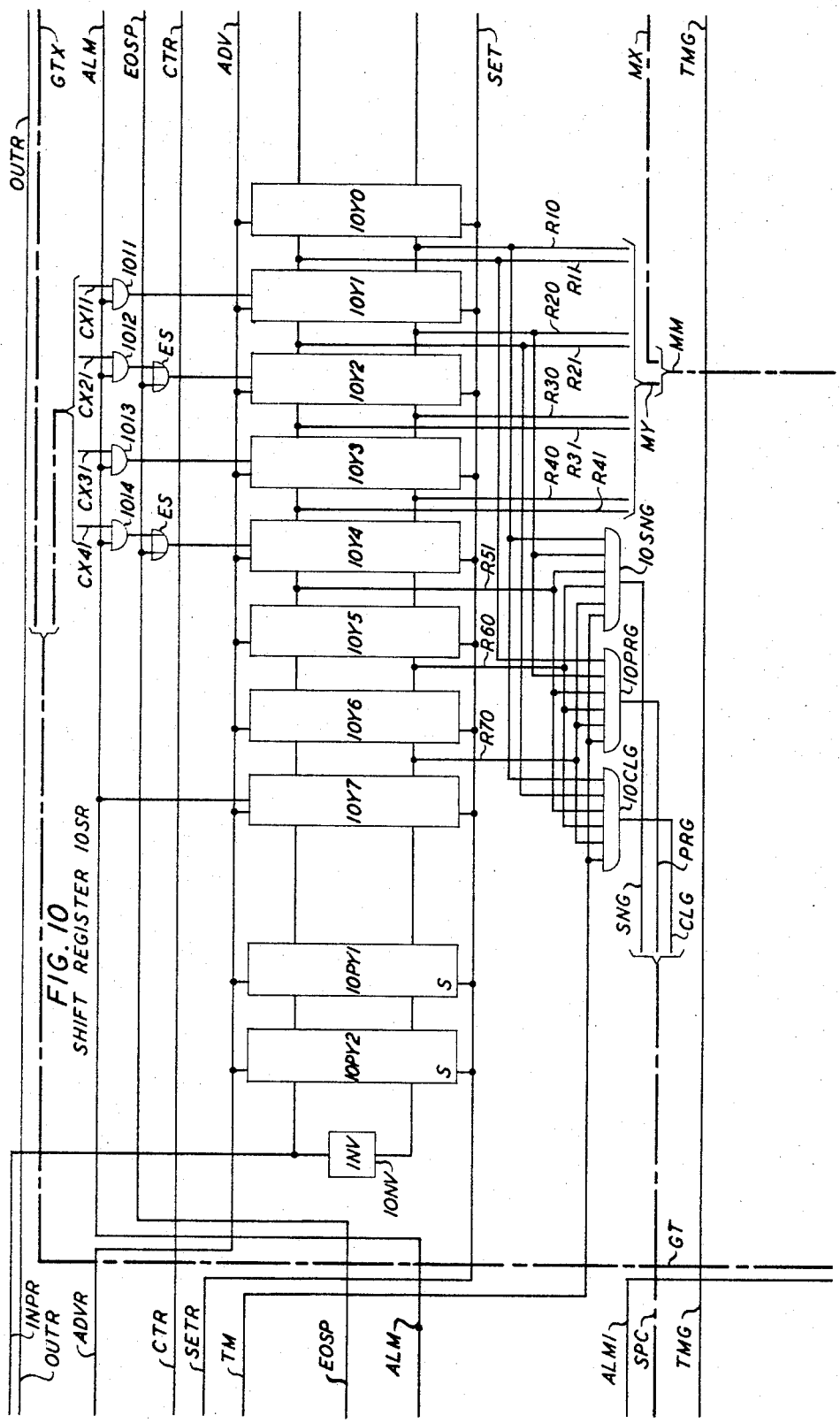
Figure 11:
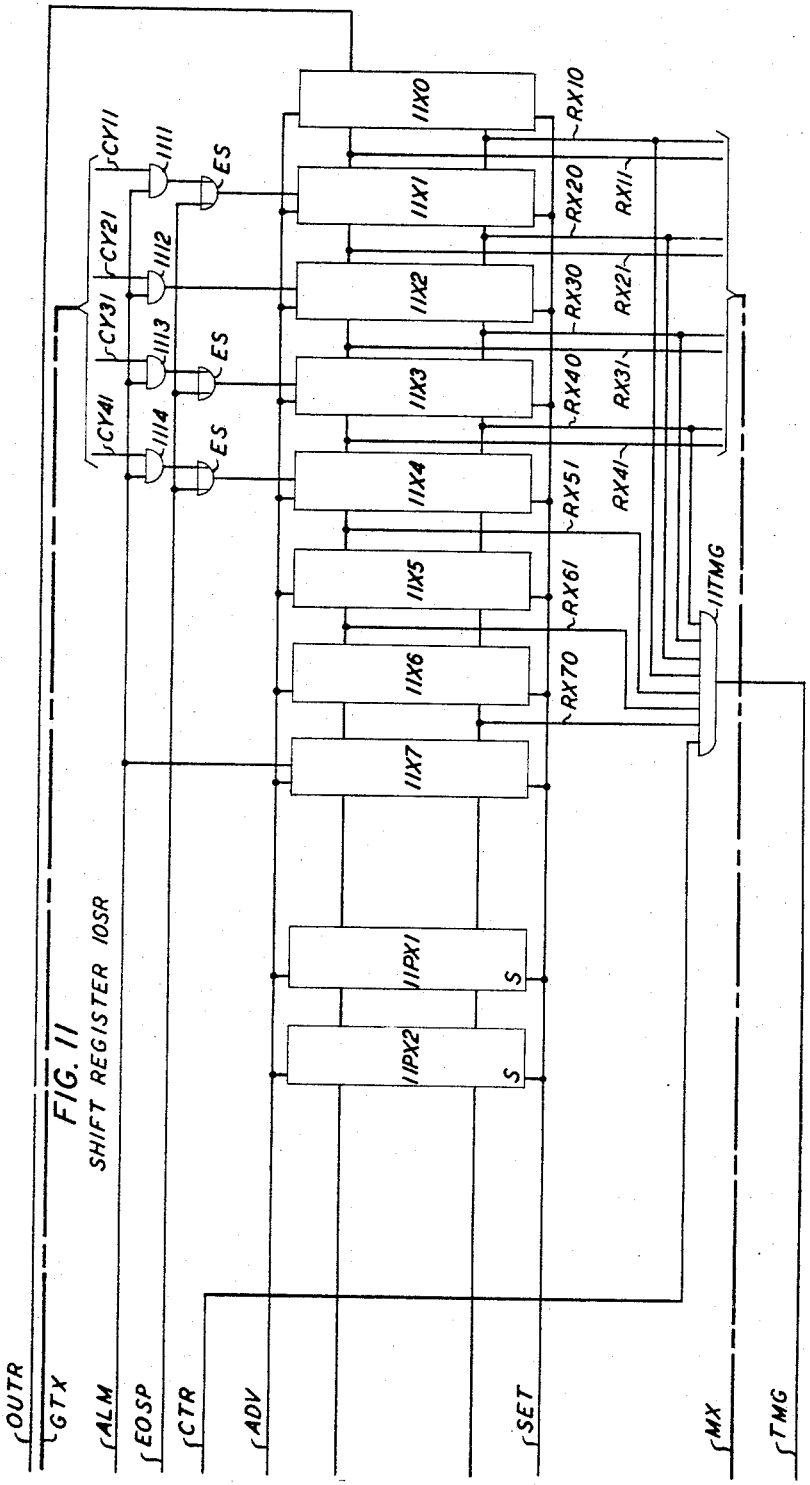
Figure 12:
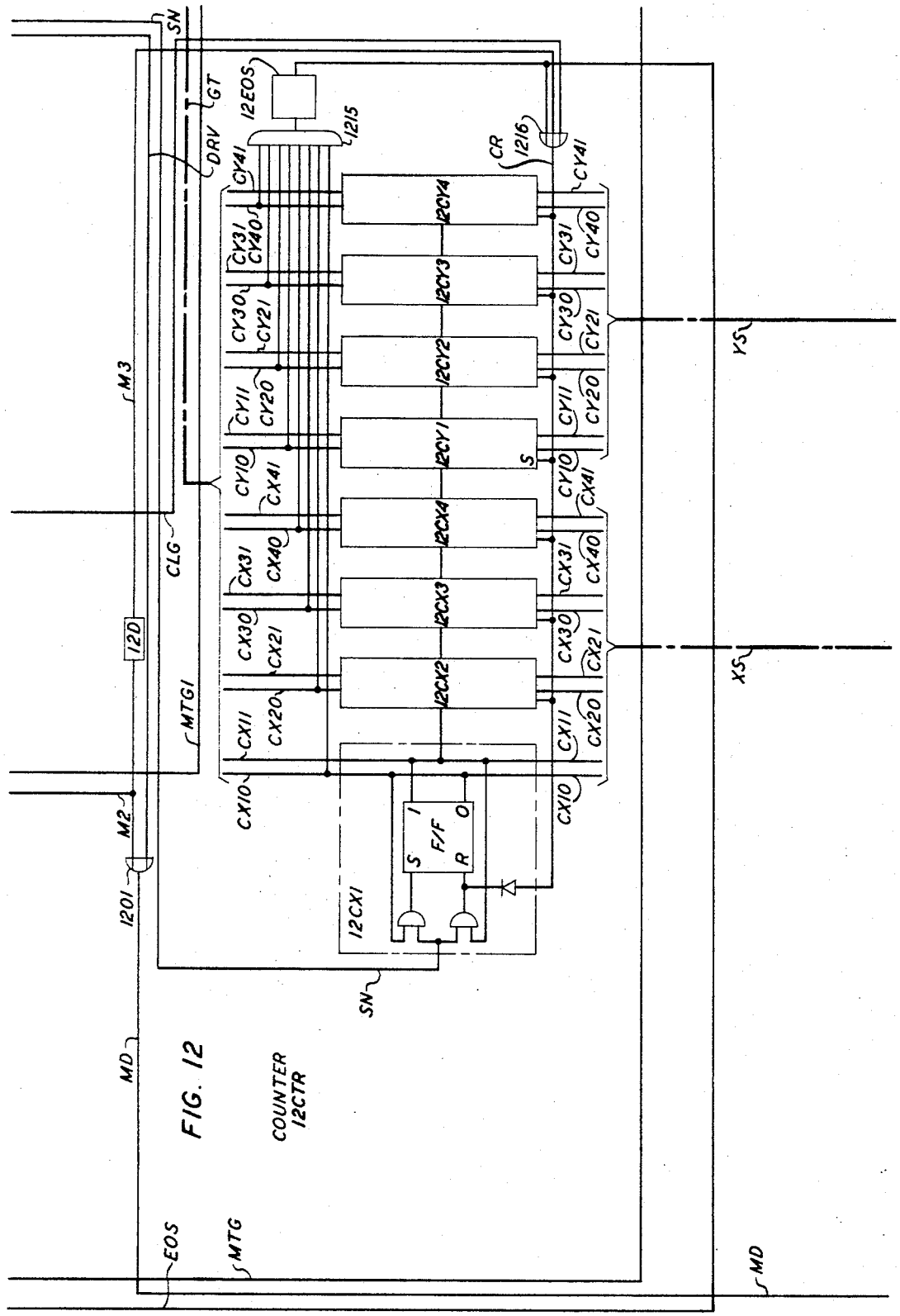
Figure 13:
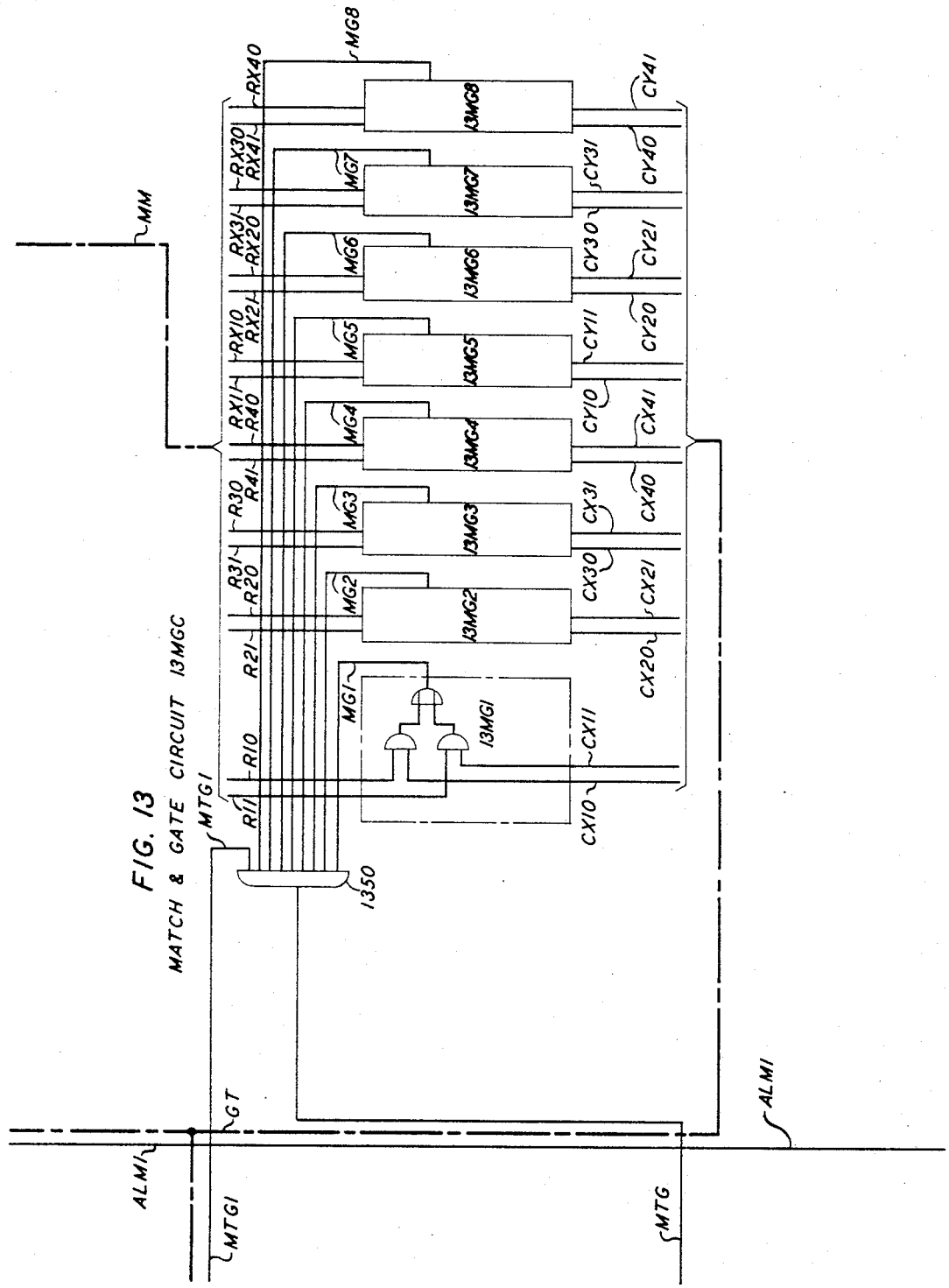
Figure 14:
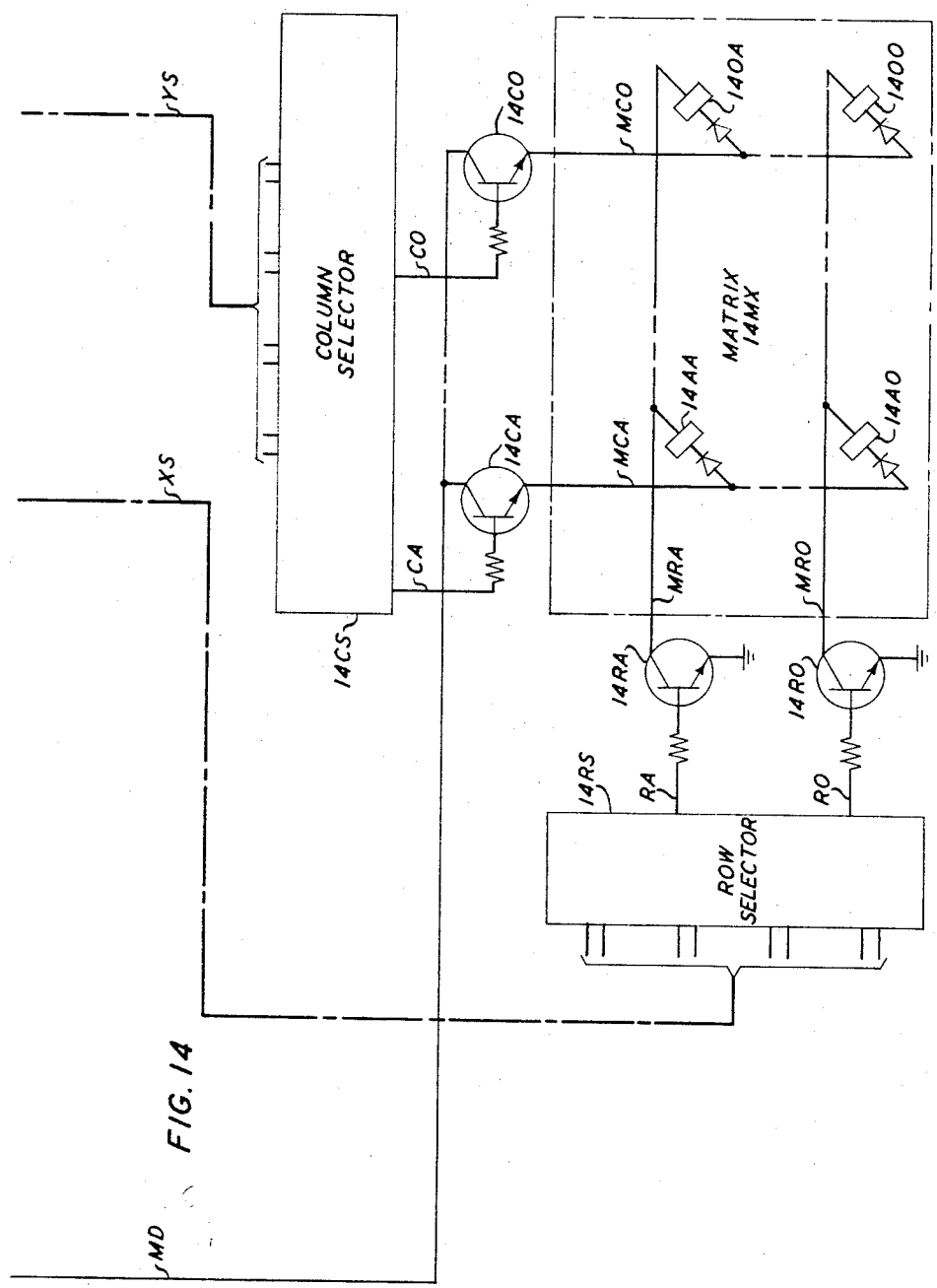

In the specific station embodiments set forth in FIGS. 3 through 8 and in FIGS. 9 through 15, the number preceding the functional designation of each of the various elements indicates the figure in which the element is located, or indicates one of the figures arbitrarily where the element extends over several figures. The illustrative central station embodiment shown in FIGS. 3 through 8, arranged in accordance with FIG. 16, basically comprises control console 3CON, scan control 4SCN, display circuitry (FIG. 5) shift register 6SR, and selector and matrix circuits (FIG. 8). The illustrative remote station embodiment shown in FIGS. 9 through 15, arranged in accordance with FIG. 17, basically comprises sequence control 9SQC, shift register 10SR, counter 12CTR, match and gate circuit 13MGC, selector and matrix circuits (FIG. 14), and equipment test and control circuits 15ETC and 15ECC. These circuits correspond to the similarly named circuits shown in the block diagram embodiment of FIGS. 1 and 2 and have been discussed generally above.

Although a plurality of remote stations, illustratively numbering eight herein, are assumed to be connected over communications link ML to the central station, only a single such remote station is shown in FIGS. 9 through 15 for the purposes of clarity and to facilitate description of the invention. For the purposes of illustration the remote station in FIGS. 9 through 15 is shown comprising 225 equipment test circuits and 225 equipment control circuits. However, it will be apparent that the number of test circuits and control circuits at a remote station need not be equal, nor need the number of either be the same for each remote station.

All communication between the central station and the remote stations is transmitted over communications link ML in the form of coded characters which may be, for example, in binary coded form in accordance with the American Standard Code for Information Interchange (ASCII). Further, it will be assumed herein for the purposes of illustration that transmission of information over link ML is by frequency shift modulation employing different frequencies for representation of the binary digit indications on each channel. Thus, first and second frequencies are employed for transmitting the respective binary digit indications from the central station to the remote stations over transmit channel TC, and third and fourth frequencies are employed for transmitting the respective binary digit indications from the remote stations to the central station over receive channel RC.

Modem 4MOD at the central station functions in a manner well known in the art to frequency shift modulate binary information for transmission over transmit channel TC, and to demodulate frequency shift signals received on receive channel RC. Respective modems at each of the remote stations, such as modem 9MOD at the remote station shown in FIGS. 9 through 15, serve similar functions with respect to information received at and transmitted from the remote stations over channels TC and RC.

As mentioned above, the illustrative code employed in the specific embodiment herein is basically the American Standard Code for Information Interchange, which employs combinations of seven binary digits for each character representation. The basic code is augmented further herein by a start bit at the beginning of each character and two stop bits at the end of each character, each character thus comprising a total of ten bits of information. A parity bit may be included also in each character in a manner well known in the art for error-detecting purposes. The bit rate for transmission of transmit channel TC is determined by clock 4CLK at the central station and the bit rate of transmission over receive channel RC is determined by clock 9CLK at the remote station, the bit rates on both channels advantageously being the same.

Each word employed in the system is composed of two characters for a total of 20 bits of information per word. A typical word transmitted from the central station over transmit channel TC, for example, may comprise the identity of a remote station as the first character thereof and an operating instruction as the second character thereof. It will be recalled that all information received or transmitted over communications link ML is stored in shift registers at the central and remote stations. Thus shift register 6SR at the central station and shift register 10SR at the remote station each include 20 stages for registering the respective bits of the individual words transmitted and received over communications link ML. Serial information is registered in shift register 6SR via input lead INP and is read out over output lead OUT. Information is parallelly registered in shift register 6SR via input leads X1 through X5, X7, Y1 through Y5, and Y7 and is read out in parallel over leads X10 through X70 and Y10 through Y70. Similarly, shift register 10SR includes serial input lead INPR, serial output lead OUTR, parallel input leads CX1 through CX4 and CY1 through CY4, and parallel output leads R10 through R70 and leads RX10 through RX70.

The individual stages of shift registers 6SR and 10SR each comprise a flip-flop and a pair of gates enabled by advance pulses on lead ADV at the central station and on lead ADVR at the remote station. Except for input stages 6PY2 and 10PY2, inputs to the gates in each shift register stage are derived from the outputs of the flip-flop in the preceding stage. The inputs to the gates in stages 6PY2 and 10PY2 are derived from modems 4MOD and 9MOD, respectively, over leads INP and INPR. Reset lead RST1 is connected through respective diodes to an input terminal of the flip-flop in each stage of shift register 6SR. Only stages 6PY2 and 6Y7 are shown in detail in the drawing. Stages 6PY1, 7PX1, and 7PX2 of shift register 6SR are substantially identical to stage 6PY2, reset lead RST1 being connected to the set terminal of the stage flip-flop, as indicated by the notation S adjacent the connection of the stage to lead RST1. The remaining stages of shift register 6SR are substantially identical to stage 6Y7, reset lead RST1 being connected to the reset terminal of the individual stage flip-flops. Thus when shift register 6SR is in a reset condition, stages 6PY1, 6PY2, 7PX1, and 7PX2 are set to register binary ones and the remaining stages are reset to register binary zeroes. Individual lamps SRL connected to the set outputs of the respective stages of shift register 6SR provide a visual indication of the contents of the shift register.

Shift register 10SR at the remote station is substantially similar to shift register 6SR at the central station. Lead SETR at the remote station is connected to the reset terminal of each stage of shift register 10SR except stages 10PY1, 10PY2, 11PX1 and 11PX2. Lead SETR is connected to the set terminal of the latter-mentioned stages of shift register 10SR. Thus, when shift register 10SR is in a reset condition, stages 10PY1, 10PY2, 11PX1 and 11PX2 are set and the remaining stages thereof are reset.

The operation of the present system is controlled by control console 3CON and scan control 4SCN at the central station. Control console 3CON provides for operator control of the system operation, and scan control 4SCN provides for automatic control of the scan mode of operation. Control console 3CON comprises mode switch 3ASC for selecting the system mode of operation, reset key 3RST for resetting shift register 6SR, and spill key 3SPL for reading out the contents of shift register 6SR on lead OUT to modem 4MOD. When mode switch 3ASC is switched to terminal AUTO, the system is placed in the automatic scan mode of operation under control of scan control 4SCN. When mode switch 3ASC is switched to terminal OPR, the system is placed under the control of an operator at the central station. Nonlocking keys or push buttons 3CK1 and 3CK2 are provided at the central station in control console 3CON to permit the operator to generate the first and second characters of words to be transmitted from the central station over channel TC when mode switch 3ASC is switched to terminal OPR.

When the system is in the scan mode of operation and an alarm indication is received over receive channel RC from a remote station being interrogated, it is displayed via selector and matrix circuits (FIG. 8) and the display circuitry (FIG. 5) to an operator for analysis. Matrix 8MX comprises an array of crosspoints arranged in rows and columns and individually associated with respective equipment test circuits at each of the remote stations. An alarm indication from a remote station, as will be described in detail below, includes two encoded characters which identify the particular alarm test circuit exhibiting the alarm condition. The two characters in the alarm indication are employed via row and column selectors 8RS and 8CS, respectively, each of which may comprise conventional binary-to-decimal diode translators, to energize the particular matrix crosspoint associated with the alarm test circuit identity. Each crosspoint in matrix 8MX is illustratively shown as comprising a relay, energization of which operates a contact thereof to light a corresponding alarm display lamp in display 5DSP.

Display 5DSP includes a plurality of alarm display lamps, one for each remote station, associated with each of crosspoint relays 8AA through 8OO of matrix M8X. When one of crosspoint relays 8AA through 8OO is energized, however, only the particular individual alarm display lamp associated with the remote station from which the alarm indication derived is lighted. The remote station identity is provided for this purpose to display 5DSP through display selector 5DSL from station address counter 5SAC if the system is operating in the automatic scan mode of operation, or from station address register 5SAR if the system is operating under the control of an operator. Display selector 5DSL advantageously may comprise a conventional diode binary-to-decimal translator, similar to that employed in row and column selectors 8RS and 8CS, which is responsive to the binary-encoded remote station identity to ground an individual corresponding one of station display leads S1 through S8.

At each remote station scanning circuitry is provided which is operable both for periodic monitoring of a plurality of equipment test circuits and for intermittent selection and energization of individual equipment control circuits. This circuitry includes counter 12CTR and the selector and matrix circuits (FIG. 14) at the remote station shown in FIGS. 9 through 15. Row and column selectors 14RS and 14CS at the remote station are substantially similar to row and column selectors 8RS and 8CS at the central station. Matrix 14MX is substantially similar to matrix 8MX and illustratively comprises a plurality of crosspoint relays 14AA through 14OO. Counter 12CTR is an 8-stage binary counter which is advanced through its successive states by pulses on lead SN. The state of counter 12CTR is reflected through row and column selectors 14RS and 14CS to energize individual ones of relays 14AA through 14OO corresponding thereto.

Associated with each of relays 14AA through 14OO via a first contact thereof is one of equipment test circuits 15ETC. Individual equipment test circuits 15ETC are shown illustratively in the embodiment in FIG. 15 as relay make contacts 15TPAA through 15TPOO. When an equipment test circuit exhibits an alarm condition, the corresponding one of contacts 15TPAA through 15TPOO is energized via circuitry not shown in the drawing to complete a path between the associated one of contacts 1 of matrix crosspoint relays 14AA through 14OO and alarm lead ALM1.

Further associated with each of matrix crosspoint relays 14AA through 14OO via a second contact thereof is one of equipment control circuits 15ECC. The individual equipment control circuits 15ECC are shown illustratively in FIG. 15 as control relays 15CPAA through 15CPOO, energization of an individual control relay being assumed to effect control of a desired equipment for corrective action in a manner well known in the art.

*Scan mode of operation*

A detailed description of the operation of the illustrative embodiment of the present invention shown in FIGS. 3 through 15, arranged in accordance with FIGS. 16 and 17, will now be considered. Assume that the operator at the central station has just placed the system in the automatic scan mode of operation by switching mode swtich 3ASC to terminal AUTO. Each of the remote stations connected to communication link ML is initially in an idle condition, the shift registers thereof being in a reset condition ready to receive any transmission over transmit channel TC from the central station. Thus, in sequence control 9SQC at the remote station each of the flip-flops shown is initially in a reset condition and relay 9SC is in a de-energized state, transistor 9Q being maintained nonconducting by bias source 901 connected to the base thereof. Shift register 6SR at the central station is also initially in a reset condition, and each of the flip-flops in scan control 4SCN is initially reset.

Operation of mode switch 3ASC to terminal AUTO extends source 310 over lead SSS, enabling gate 411. Gate 411 thus applies the next clock pulse appearing on lead CLK from clock 4CLK therethrough to the set terminal of start scan flip-flops 4SS, setting flip-flop 4SS. The set output of flip-flop 4SS over lead 425 enables gate 423 to apply the next succeeding clock pulse on lead CLK therethrough to set scan flip-flop 4SC. The set output of flip-flop 4SC on lead 430 lights lamp 4ON to indicate that the system has been placed in the automatic scan mode of operation and sets start flip-flop 4ST through OR-gate 426.

Flip-flop 4SC also via lead 430 and lead SC1 over cable SCC enables gates 511 through 516 connected between the outputs of station address counter 5SAC and shift register 6SR and display selector 5DSL. Station address counter 5SAC initially contains the address or identity of the first remote station to be interrogated. For the purposes of illustration herein, the identity of the first remote station is arbitrarily represented by the decimal digit 0, corresponding to the reset state for counter stages 5SA1 through 5SA3, and is assumed to be the identity of the remote station shown in FIGS. 9 through 15.

The state of station address counter 5SAC is reflected through enabled gates 511 through 516 and through OR-gates 521 through 526 to display selector 5DSL. In its initial state, therefore, registering the identity of the first remote station, the reset condition of counter stages 5SA1 through 5SA3 provides signals through gates 511, 513, and 515, respectively, and OR-gates 521, 523, and 525, respectively, to display selector 5DSL. Display selector 5DSL is responsive to this particular combination of inputs to ground station display lead S1 to display 5DSP. The ground on lead S1 prepares a path for lighting the individual display lamps 5AA1 through 5OO1 in display 5DSP associated with the first remote station should any alarm indication be received from the first remote station during the subsequent interrogation thereof.

The setting of start flip-flop 4ST, in the manner described above, provides a signal through gate 428 to enable gate 429, gate 428 being enabled by the set output of start scan flip-flop 4SS on lead 425. The next succeeding clock pulse on lead CLK is directed through gate 429 to energize set monopulser 4SET. Gate 427 is also enabled by the set output of flip-flop 4ST to direct this clock pulse on lead CLK therethrough to the reset terminal of flip-flop 4ST, resetting flip-flop 4ST. Set monopulser 4SET is energized by the clock pulse through gate 429 to provide a set pulse over lead SET to effect storage in shift register 6SR of the word to be transmitted by the central station over transmit channel TC to the several remote stations. Each word transmitted by the central station, it will be recalled, comprises two characters each having 10 bits of information including a 7-bit ASCII encoded character preceded by a start bit and followed by two stop bits. The word initiating interrogation of a remote station comprises the identity of the station as the first character of the word and a scan instruction as the second character of the word. The scan instruction may be any unused ASCII character, such as $DC_0$ for example, (represented by binary 0010000). The start bit for each character is assumed herein for the purposes of illustration to be a binary 0 and the two stop bits are assumed to be binary 1's.

The first character of the word initiating interrogation, therefore, is the identity of the remote station and is registered, inclusive of start and stop bits, in stages 7X0 through 7PX2 of shift register 6SR. As mentioned above, the remote station identity appears in station address counter 5SAC and is reflected through gates 511 through 516 and through OR-gates 521 through 526. The outputs of OR-gates 522, 524, and 526, that is, the OR-gates connected to the set outputs of stages 5SA1 through 5SA3, respectively, are connected over respective leads A1 through A3 and cable AAA to individual ones of gates 701 through 703. Since each of stages 5SA1 through 5SA3 of counter 5SAC is in a reset state representative of the decimal digit 0, the identity of the first remote station to be interrogated, no signals appear on leads A1 through A3 at this time. Therefore, the set pulse on lead SET from set monopulser 4SET is not directed through any of gates 701 through 703, and shift register stages 7X1 through 7X3 of shift register 6SR accordingly remain in their reset state.

The remaining binary digits making up the first character are the same regardless of the remote station identity and are registered in shift register stages 7X0 and 7X4 through 7PX2. When shift register 6SR is initially placed in a reset condition, stage 7X0 is reset to store the start bit for the first character, stages 7X4 through 7X7 are reset, and stages 7PX1 and 7PX2 are set to store the two stop bits for the first character. Stages 7X5 and 7X6 are set by the set pulse on lead SET over lead 730 through OR-gates 714 and 715, respectively, to complete registration in stages 7X0 through 7PX2 of the 7-bit ASCII representation of decimal digit 0, the identity of the remote station shown in FIGS. 9 through 15.

The second character, the scan instruction $DC_0$ is registered in stages 6Y0 through 6PY2 of shift register 6SR. When shift register 6SR is initially placed in the reset condition, the start bit "0" is automatically placed in stage 6Y0, the stop bits "1" are registered in stages 6PY1 and 6PY2, and stages 6Y1 through 6Y7 are reset. The set pulse, provided in the manner above described, on lead SET is directed through OR-gate 610 to set stage 6Y5 of shift register 6SR. At this point, therefore, registration in stages 6Y0 through 6YP2 of the scan instruction DC₀ inclusive of start and stop bits, is complete.

The set pulse on lead SET from monopulser 4SET is also applied through OR-gate 401 to set advance flip-flop 4AV, the output thereof enabling gates 402 and 403. The next succeeding clock pulse on lead CLK is directed through gate 402 to energize advance monopulser 4ADV and through gate 403 to counter 4CTR. Upon energization, advance monopulser 4ADV generates an advance pulse on lead ADV. The advance pulse on lead ADV is applied to each stage of shift register 6SR, shifting the information therein one stage to the right. The bit of information in shift register stage 7X0 is provided, therefore, over lead OUT to modem 4MOD for transmission over channel TC to the remote stations. Advance monopulser 4ADV is similarly energized by each successive clock pulse on lead CLK through gate 402 to advance the information in shift register 6SR bit by bit over lead OUT to modem 4MOD and thence over channel TC to the remote stations.

At the same time, each successive clock pulse on lead CLK is directed through gate 403 to counter 4CTR. Counter 4CTR keeps track of the advance of the information out of shift register 6SR. When the entire word has been shifted out over lead OUT, as indicated by the receipt of 20 clock pulses, counter 4CTR provides an end-of-word signal on lead 404 to reset flip-flop 4AV and to energize selector monopulser 4SEL. The output pulse from monopulser 4SEL through inhibit gate 406 and OR-gate 415 energizes reset monopulser 4RES. Delay 4DL provides a delay sufficient to insure that the last bit of information has been advanced out of shift register 6SR on lead OUT before counter 4CTR provides the end-of-word signal on lead 404. Reset monopulser 4RES, upon energization, provides a reset pulse on lead RST1 to again place shift register 6SR in its initial reset condition, that is, with stages 6PY1, 6PY2, 7PX1, and 7PX2 set and the remaining stages thereof reset.

At this point, then, the entire word previously registered in shift register 6SR, comprising the identity of the remote station in FIGS. 9 through 15 and a scan instruction, has been transmitted serially over transmit channel TC to each of the remote stations and registered in the respective shift registers thereat. As each bit of information is received on channel TC and demodulated by modem 9MOD at the remote station, it is directed over lead INPR to shift register 10SR. The first or start bit of information received is thus directed over lead INPR for registration in stage 10PY2 of shift register 10SR. The start bit, illustratively a binary 0 herein, is applied through inverter 10NV to the reset terminal of stage 10PY2, which is already in the reset state. The start bit is also applied through inverter 9NV to the set terminal of start flip-flop 9STT. The set output of flip-flop 9STT through OR-gate 901 sets advance flip-flop 9AV, the output of which enables gates 921 and 922. The next succeeding clock pulse or lead CLKR from clock 9CLK is thus directed through gate 921 to energize advance monopulser 9ADV and through gate 922 to counter 9CTR. Advance monopulser 9ADV, upon energization, provides an advance pulse over lead ADVR to each stage of shift register 10SR, advancing the first bit of information just registered in stage 10PY2 to stage 10PY1, thus preparing stage 10PY2 for receiving the second bit of information on lead INPR.

The second and each successive bit of information received on lead INPR is initially registered in stage 10PY2. Each successive clock pulse on lead CLKR energizes advance monopulser 9ADV through enabled gate 921 to advance the information in shift register 10SR one stage to the right. At the same time, counter 9CTR via clock pulses through enabled gate 922 keeps track of the received bits of information and, when the entire word has been received from the central station and registered in shift register 10SR, provides an end-of-word signal on lead CTR to reset flip-flops 9STT and 9AV.

The end-of-word signal on lead CTR is also applied to station identity gate 11TMG. When the entire word has been registered in shift register 10SR, the portion of the first character thereof identifying the remote station to which the operating instruction in the second character is directed is registered in stages 11X1 through 11X7. The combination of outputs for stages 11X1 through 11X7 corresponding to the identity of the remote station is connected to station identity gate 11TMG. Thus, the set outputs of stages 11X5 and 11X6 are connected to gate 11TMG over leads RX51 and RX61, respectively, and the reset outputs of the remaining stages 11X1 through 11X4 and 11X7 are connected to gate 11TMG over leads RX10, RX20, RX30, RX40, and RX70, respectively. Inasmuch as the character registered in stages 11X1 through 11X7 corresponds to the identity of the remote station shown in FIGS. 9 through 15, each of the above leads connected to gate 11TMG is energized. The end-of-word signal on lead CTR therefore is directed through gate 11TMG over lead TMG to set station identity flip-flop 9TM.

Flip-flop 9SK1 is set by the output of flip-flop 9TM on lead 950, the output of flip-flop 9SK1 setting flip-flop 9SK2. The set output of flip-flop 9SK2 provides a signal over lead SK to energize the transmit portion of modem 9MOD. Modem 9MOD is thus enabled to modulate and transmit over channel RC any words subsequently advanced to modem 9MOD over lead OUTR from shift register 10SR.

The set output of flip-flop 9TM on lead 950 is also directed over lead TM to each of instruction gates 10CLG, 10PRG, and 10SNG. Each of these gates, as will be described below, functions to detect the presence of a particular operating instruction in the second character of a word registered in shift register 10SR. Specifically, gate 10SNG is connected to a particular combination of outputs of stages 10Y1 through 10Y7 to enable it to recognize the presence of a scan instruction in the second character of the word registered in shift register 10SR. The scan instruction, it will be recalled, is illustratively the character DC₀ in the ASCII. This is detected by gate 10SNG upon the presence of a binary 1 in stage 10Y5 and the presence of a binary 0 in each of stages 10Y1 through 10Y4, 10Y6, and 10Y7. The bits of information registered in stages 10Y3 and 10Y4 are the same for the scan instruction as for the operating instructions to be detected by gates 10CLG and 10PRG, and thus the outputs of stages 10Y3 and 10Y4 need not be connected to any of gates 10CLG, 10PRG, and 10SNG. Accordingly, to detect the presence of a scan instruction, output leads R10, R20, R51, R60, and R70 of stages 10Y1, 10Y2, and 10Y5 through 10Y7, respectively, are connected to gate 10SNG.

Gate 10SNG is therefore enabled by the presence of the scan instruction registered in stages 10Y1 through 10Y7 to direct the signal on lead TM therethrough over lead SNG and cable SPC through OR-gate 943 to set scan flip-flop 9SN. The set output of scan flip-flop 9SN is connected to gates 925 and 961. Gate 961 is enabled by the reset condition of flip-flop 9PRP, and thus drive flip-flop 9DR is set to enable gate 927. The next succeeding clock pulse on lead CLKR is directed through gate 925 to energize scan monopulser 9SCN and through gate 927 to energize drive monopulser 9DRV. Monopulser 9SCN provides a scan pulse over lead SN to counter 12CTR, and successive clock pulses on lead CLKR similarly energize monopulser 9SCN to provide a succession of scan pulses on lead SN to counter 12CTR. Drive monopulser 9DRV is similarly responsive to successive clock pulses through gate 927 to provide drive pulses on lead DRV.

Counter 12CTR may be considered as two 4-bit counters connected in series, each stage thereof being substantially similar to stage 12CX1 except that reset lead CR is connected to the set terminal of the flip-flop in stage 12CY1. The four bits in stages 12CX1 through 12CX4 are employed through row selector 14RS for selecting a particular row lead in matrix 14MX and the four bits in stages 12Y1 through 12Y4 are employed through column selector 14CS to select a particular column in matrix 14MX. In the illustrative embodiment herein matrix 14MX comprises 15 rows and 15 columns. Therefore the 15 characters A through O in the ASCII may be employed advantageously to designate the individual rows and columns; and inasmuch as three bits of the 7-bit ASCII representation of each of these characters is the same, only four bits of information are required to identify a particular row or column in matrix 14MX. Initially, therefore, counter 12CTR is in a reset condition with every stage thereof except stage 12CY1 registering a binary 0. Stage 12CY1 initially contains a binary 1. Thus, in the counter reset condition, stages 12CY1 through 12CY4 contain the encoded character A, and stages 12CX1 through 12CX4 each contain a binary 0.

The outputs of stages CY1 through CY4 are connected over cable YS to column selector 14CS, and the outputs of stages 12CX1 through 12CX4 are connected over cable XS to row selector 14RS. Iinitially, therefore, column selector 14CS is responsive to the encoded character A registered in stages 12Y1 through 12Y4 to energize output lead CA, thereby enabling column driver 14CA connected to column lead MCA. Drive current is applied to column drivers 14CA through 14CO, via OR-gate 1201 over matrix drive lead MD, by the output signals from drive monopulser 9DRV in sequence control 9SQC. Monopulser 9DRV is initially energized, it will be recalled, by the same clock pulse that intially energizes monopulser 9SCN to provide the first scan pulse on lead SN, delay 9D1 being sufficient to ensure that monopulser 9SCN is energized to advance counter 12CTR before drive monopulser 9DRV is energized. Drive current is thus directed through enabled column driver 14CA to column lead MCA.

Row drivers 14RA through 14RO are selectively operable to connect ground potential to the individual row conductors MRA through MRO. Initially, none of row drivers 14RA through 14RO are enabled by row selector 14RS. However, with the application of the first scan pulse over lead SN to counter 12CTR, in the manner described above, counter stage 12CX1 is set to register a binary 1 therein. Stages 12CX1 through 12CX4 now contain the encoded character A and row selector 14RS is responsive thereto to energize output lead RA, enabling row driver 14RA to ground row lead MRA. This completes a path for energizing matrix crosspoint relay 14AA connected between column lead MCA and row lead MRA. Relay 14AA operates and via make contact 1 thereof completes a path from source 1501 through the break portion of transfer contact 1 of relay 9SC to equipment test circuit make contact 15TP1. If the equipment test circuit associated with contact 15TP1 is in an alarm condition, contact 15TP1 is operated by circuitry not shown to extend source 1501 therethrough to alarm lead ALM1. However, for the present it will be assumed that no alarm condition appears and that test circuit contact 15TP1 remains unoperated.

Successive scan pulses on lead SN advance counter 12CTR through its successive states and drive current pulses are provided by drive monopulser 9DRV in response to each successive clock pulse, thus energizing the individual combinations of row and column leads in matrix 14MX to operate individual crosspoint relays 14AA through 14OO in sequence. As each relay is operated, its make contact 1 operates to complete a path between source 1501 and the associated one of equipment test circuit contacts 15TPAA through 15TPOO. For example, the second scan pulse on lead SN resets counter stage 12CX1, the resetting of which sets counter stage 12CX2. Stages 12CX1 through 12CX4 then contain the binary representation of the row character B to which row selector 14RS is responsive to enable the appropriate one of row drivers 14RA through 14RO to ground row lead MRB (not shown). When monopulser 9DRV is energized by the second clock pulse through gate 927, column lead MCA is again energized since stages CY1 through CY4 of counter 12CTR still contain the column character A. The consequent energization of crosspoint relay 14AB (not shown) operates make contact 1 thereof to connect source 1501 therethrough to equipment test circuit contact 15TP2.

The scanning of equipment test circuits 15TP1 through 15TPOO continues in this manner, assuming no alarm condition exists, until each of relays 14AA through 14OO has been energized in sequence. When counter 12CTR advances to its final state for energizing relay 14OO, a binary 1 is registered in each of stages 12CX1 through 12CX4 and 12CY1 through 12CY4, representative of row and column characters O. The next pulse on lead SN, therefore, advances counter 12CTR to a state registering a binary 0 in each stage thereof, to which combination of counter outputs row and column selectors 14RS and 14CS are not responsive. The binary 0 output of each of the stages of counter 12CTR is connected to gate 1215, however, which detects the presence of this particular state of counter 12CTR and energizes end-of-scan monopulser 12EOS. Monopulser 12EOS provides an end-of-scan signal on lead EOS through OR-gate 1216 over reset lead CR to place counter 12CTR in its initial reset condition, registering a binary 1 in stage 12CY1.

The end-of-scan signal on lead EOS also resets station identity flip-flop 9TM through OR-gate 903, resets flip-flop 9SK1 through OR-gate 904, resets scan flip-flop 9SN through OR-gate 944, sets advance flip-flop 9AV through OR-gate 901, and energizes set monopulser 9SET through OR-gate 923. The resetting of flip-flop 9TM disables instruction gates 10CLG, 10PRG, and 10SNG. The resetting of flip-flop 9SN disables gate 925 to prevent the generation of further scan pulses on lead SN, and resets flip-flop 9DR through gate 962 which disables gate 927 to prevent the further generation of drive signals on lead DRV.

The energization of set monopulser 9SET by the end-of-scan signal on lead EOS provides a signal on lead SETR to place shift register 10SR in its reset condition. The reset condition of shift register 10SR, it will be recalled, comprises the registration of binary 1's as stop bits in stages 10PY1, 10PY2, 11PX1, and 11PX2 and the resetting of the remaining stages. After a delay provided by delay 9D3 to ensure that shift register 10SR has been placed in its reset condition, the end-of-scan signal on lead EOS energizes end-of-scan monopulser 9EOSP to register an end-of-scan word in shift register 10SR. Monopulser 9EOSP provides a signal for this purpose over lead EOSP through respective OR-gates ES to set stages 10Y2, 10Y4, 11X1, 11X3, and 11X4 of shift register 10SR. The end-of-scan word therefore advantageously comprises, as the first and second characters thereof respectively, the carriage return and line feed characters in the ASCII. This facilitates teletypewriter print out of a permanent record of all transmissions in the system.

The end-of-scan word has thus been registered in shift register 10SR, and the next 20 clock pulses on lead CLKR are directed through gates 921 and 922, enabled upon the setting of flip-flop 9AV by the end-of-scan signal on lead EOS, to advance monopulser 9ADV and counter 9CTR, respectively. In the manner described above, therefore, the end-of-scan word is advanced serially out of shift register 10SR over lead OUTR to modem 9MOD for transmission over channel RC to the central station. Responsive to the twentieth clock pulse received, indicating advance of the last bit of the end-of-scan word out of shift register 10SR, counter 9CTR provides an end-of-word signal over lead CTR to reset flip-flop 9AV, thereby distabling gates 921 and 922. The signal on lead CTR is also directed through gate 931, which is enabled by the reset condition of flip-flop 9TM, and through OR-gate 923 to energize set monopulser 9SET. Monopulser 9SET generates a signal on lead SETR to restore shift register 10SR to its reset condition.

Further, the end-of-word signal on lead CTR is directed through gate 933, which is enabled by the reset condition of flip-flop 9SK1, and through OR-gate 941 to reset flip-flop 9SK2. The resetting of flip-flop 9SK2 removes the enabling signal from lead SK, thereby disabling the transmit portion of modem 9MOD. At this point then, the remote station is in its initial idle condition ready to search each subsequent transmission from the control station for its station identity.

At the central station the first bit of the end-of-scan word received over channel RC from the remote station is demodulated by modem 4MOD and directed over lead INP for registration in stage 6PY2 of shift register 6SR. The first bit also sets advance flip-flop 4AV through OR-gate 401, the output of flip-flop 4AV enabling gates 402 and 403. The next 20 clock pulses on lead CLK are directed through gates 402 and 403 to advance monopulser 4ADV and counter CTR, respectively. The resultant advance pulses from monopulser 4ADV on lead ADV advance the successive bits of the end-of-scan word received on lead INP serially through the stages of shift register 6SR until the entire word is registered therein. At this point counter 4CTR, responsive to the twentieth clock pulse received, provides an end-of-word signal on lead 404, resetting flip-flop 4AV and setting flip-flop 4TT.

The output of flip-flop 4TT is applied over lead TTL to gates 6LF and 7CR. The first character of the end-of-scan word is registered in stages 7X1 through 7X7 of shift register 6SR and is detected by gate 7CR to enable it to direct a signal over lead CR to gate 750. The second character of the end-of-scan word is registered in stages 6Y1 through 6Y7 and is detected by gate 6LF to direct the signal on lead TTL therethrough over lead LF to gate 750. The concurrence of signals on lead LF and lead CR provides a signal through gate 750 over lead ESC to enable gate 408 and to disable inhibit gate 406. Accordingly, the next clock pulse on lead CLK through gate 408 sets end-of-scan flip-flop 4EOS, and the clock pulse through gate 405 resets flip-flop 4TT after a delay provided by delay 4DT. Selector monopulser 4SEL is responsive to the end-of-word signal on lead 404 from counter 4CTR to provide a signal on lead SEL to gate 406. However, inasmuch as gate 406 is inhibited by the signal on lead ESC, the signal on lead SEL is not directed through gate 406 to reset monopulser 4RES.

Flip-flop 4EOS, upon being set, enables gates 409, 421 and 422. Gate 409 directs the next clock pulse on lead CLK to the reset terminal of flip-flop 4OES. The next clock pulse on lead CLK isalso directed through gate 421 to energize address monopulser 4ADR, and through gate 421 and OR-gate 415 to energize reset monopulser 4RES. Reset monopulser 4RES provides a reset pulse on lead RST1 to place shift register 6SR in its reset condition. Address monopulser 4ADR provides a signal over lead ADR through gate 550, enabled by the set output of flip-flop 4SC on lead SC1. to station address counter 5SAC, advancing counter 5SAC to its next successive state. In this instance the next state of counter 5SAC is the binary representation of the decimal digit 1, assumed herein to be the identity of the second remote station to be interrogated, stage 5SA1 being set, and stages 5SA2 and 5SA3 remaining reset.

The outputs of counter 5SAC are directed through gates 512, 513, and 515 and through OR-gates 522, 523, and 525, respectively, to display selector 5DSL. Display selector 5DSL is responsive thereto to ground display selector lead S2 to display 5DSP, preparing a path for lighting the individual alarm display lamps 5AA2 through 5OO2 associated with the second remote station should any alarm be received therefrom.

At the same time, the above-mentioned clock pulse on lead CLK is directed through gate 422 and OR-gate 426 to set flip-flop 4ST, the output of which through gate 428 enables gate 429. Gate 428 is enabled by the set condition of flip-flop 4SS. The next clock pulse on lead CLK through gate 427, enabled by the set condition of flip-flop 4ST, resets flip-flop 4ST, and the same clock pulse through gate 429 energizes set monopulser 4SET. Monopulser 4SET provides a set pulse on lead SET to register the identity of the second remote station and the scan instruction in shift register 6SR. The station identity is provided by station address counter 5SAC over leads A1 through A3, lead A1 being energized in this instance by the set condition of stage 5SA1 to indicate the identity of the second remote station. Therefore, the set pulse on lead SET is directed through gate 701, enabled by the signal on lead A1, and OR-gate 711 to set stage 7X1 of shift register 6SR. The pulse on lead SET is also directed over lead 730 through OR-gates 714 and 715 to set stages 7X5 and 7X6, thereby completing registration of the identity of the second remote station as the first character in shift register 6SR. The set pulse on lead SET is directed further through OR-gate 610 to set stage 6Y5, completing registration of the scan instruction $DC_0$ as the second character in shift register 6SR.

The central station proceeds to transmit the word registered in shift register 6SR out over channel TC to the several remote stations, in the manner described above. Although the word is received and registered in the shift registers at each remote station, including shift register 10SR at the remote station shown, only the station identity gates at the second remote station is energized. At the other remote stations, such as the remote station shown, the word registered in the shift register is discarded and the shift register is restored to its reset condition. Thus, the end-of-word signal from counter 9CTR on lead CTR is directed through gate 931 enabled by the reset condition of flip-flop 9TM and through OR-gate 923 to energize set monopulser 9SET. The output of monopulser 9SET over lead SETR restores shift register 10SR to its reset condition.

The second remote station (not shown) detects its identity registered in the shift register thereat via a station identity gate and proceeds to scan automatically the equipment test circuits threat, in the manner described above. Responsive to the completion of the scan, an end-of-scan word is transmitted from the second remote station to which scan control 4SCN at the central station responds to advance station address counter 5SAC. The next state of station address counter 5SAC corresponds to the identity of the third remote station to be interrogated, and so the interrogation of the remote stations proceeds until all of the remote stations have been interrogated in sequence. Responsive to the end-of-scan word from the final remote station, illustratively the eighth remote station herein, counter 5SAC is advanced to return it to the state thereof corresponding to the identity of the first remote station. Thus, the cycle of remote station interrogation repeats until the operator at the central station terminates the automatic scan mode of operation by operating mode switch 3ASC to terminal OPR.

Movement of mode switch 3ASC to terminal OPR extends source 310 over lead SSR to enable gate 412. The next clock pulse on lead CLK through gate 412 resets start-scan flip-flop 4SS, the reset output thereof being applied to gate 410. The interrogation of the particular remote station in progress at this time continues until the end-of-scan word is received therefrom and registered in shift register 6SR. The end-of-scan word in shift register 6SR is detected by gates 7CR and 6LF to set flip-flop 4EOS, as described above, the output thereof being applied to gate 410. Gate 410, responsive to the set output of flip-flop 4EOS and the reset output of flip-flop 4SS, enables gate 424. The next clock pulse on lead CLK is directed through gate 424 to reset scan flip-flop 4SC, thereby extinguishing lamp 4ON and de-energizing lead SC1 to terminate scanning operation.

It may be noted that the output of flip-flop 4EOS also enables gates 421 and 422 as usual to direct a clock pulse therethrough to energize reset monopulser 4RES, to energize address monopulser 4ADR and to set flip-flop 4ST. Gate 429 is not enabled by the output of flip-flop 4ST since gate 428 is disabled by the reset condition of flip-flop 4SS. Flip-flop 4ST is reset by the next clock pulse on lead CLK through gate 427. Energization of reset monopulser 4RES resets shift register 6SR to its reset condition via lead RST1, and address monopulser 4ADR advances station address counter 5SAC. Thus, counter 5SAC contains the identity of the next remote station to be interrogated in the cycle when mode switch 3ASC is returned to terminal AUTO.

*Detection of an alarm*

Assume, for the purposes of describing the operation of the system upon detection of an alarm, that the remote station shown in FIGS. 9 through 15 is being interrogated and that during the scan of the equipment test circuits 15ETC a particular alarm condition is present, as indicated for example by the operated condition of test circuit contact 15TPOA. When counter 12CTR is advanced to the state wherein row lead MRA and column lead MCO are enabled to energize matrix crosspoint relay 14OA, contact 1 of relay 14OA completes a path between source 1501 and alarm lead ALM1. This path may be traced from source 1501 through the break portion of transfer contact 1 of relay 9SC, operated contact 1 of relay 14OA, and operated test circuit contact 15TPOA to lead ALM1. The extension of source 1501 over lead ALM1 through AND gate 935 sets alarm flip-flop 9ALM.

The output of flip-flop 9ALM through OR-gate 944 resets scan flip-flop 9SN, the reset output of which through gate 962 resets drive flip-flop 9DR. The resetting of flip-flop 9DR disables gate 927 to prevent the generation of further drive signals on lead DRV by drive monopulser 9DRV. The resetting of scan flip-flop 9SN disables gate 925 to prevent the generation of further scan pulses on lead SN by scan monopulser 9SCN. The state of counter 12CTR at this point, therefore, corresponds to the identity of the particular equipment test circuit exhibiting the alarm condition, that is, the particular equipment test circuit identified by the characters OA.

The output of alarm flip-flop 9ALM is also directed over lead 999 through OR-gate 923 to energize set monopulser 9SET and through delay 9D2 to energize alarm monopulser 9ALM. The output of set monopulser 9SET on lead SET places shift register 10SR in its reset condition. Alarm monopulser 9ALM, after a delay provided by delay 9D2 to ensure that shift register 10SR has been reset, generates a signal on lead ALM, enabling gates 1011 through 1014 and 1111 through 1114 to effect the registration in shift register 10SR of the identity of the particular equipment test circuit presenting the alarm condition. As mentioned above, the identity of the particular test circuit appears in counter 12CTR and it is reflected over cable GT to shift register 10SR. More particularly, the binary 1 outputs of stages 12CX1 through 12CX4 of counter 12CTR are connected via respective leads CX11, CX21, CX31, and CX41 to gates 1011 through 1014, respectively, and the binary 1 outputs of stages 12CY1 through 12CY4 are connected via leads CY11, CY21, CY31, and CY41 to gates 1111 through 1114, respectively. For the illustrative test circuit exhibiting alarm herein, therefore, leads CX11, CX21, CX31, CX41, and CY11 are energized to enable the signal on alarm lead ALM to set stages 10Y1 through 10Y4 and 11X1, respectively, of shift register 10SR. Stages 10Y7 and 11X7 are also set by the signal on lead ALM to complete the ASCII representation of the two characters identifying the test circuit exhibiting the alarm condition.

Advance flip-flop 9AV is set by the output of alarm flip-flop 9ALM through OR-gate 901 to enable gates 921 and 922. In the manner described above, in connection with the end-of-scan word, the next 20 clock pulses on lead CLKR through gate 921 enable advance monopulser 9ADV to advance the alarm identity word out of shift register 10SR over lead OUTR to modem 9MOD for transmission to the central station. Responsive to the twentieth clock pulse received through gate 922, counter 9CTR generates an end-of-word signal on lead CTR to reset flip-flop 9AV and through gate 942, enabled by the set output of alarm flip-flop 9ALM and the reset output of flip-flop 9PRP, and through OR-gate 943 to set scan flip-flop 9SN. After a delay provided by delay 9D4, alarm flip-flop 9ALM is reset by the end-of-word signal on lead CTR.

The setting of scan flip-flop 9SN enables gate 925 and sets drive flip-flop 9DR through gate 961 to enable gate 927. Succeeding clock pulses on lead CLKR energize scan monopulser 9SCN through gate 925 and drive monopulser 9DRV through gate 927 and delay 9D1. Accordingly, the scanning of the equipment test circuits 15ETC at the remote station resumes where it left off, the first scan pulse on lead SN advancing counter 12CTR to the state immediately following the state corresponding to the identity of the test circuit at which the alarm was just detected. The first drive signal from monopulser 9DRV after scanning is resumed, therefore, energizes matrix crosspoint relay 14OB (not shown) connected between column conductor MCO and row conductor MRB (not shown).

At the central station the alarm identity word, illustratively comprising the characters OA, is received and registered in shift register 6SR in the manner described above. The outputs of shift register stages 6Y1 through 6Y4 are connected over cable CSY to row selector 8RS, and the outputs of stages 6X1 through 6X4 are connected over cable CSX to column selector 8CS. Row character A registered in stages 6Y1 through 6Y4 thus energizes output leads Y11, Y20, Y30, and Y40 of cable CSY, to which row selector 8RS is responsive to energize row selector lead RSA, thereby enabling row driver 8RA to connect ground to row lead RLA. Column character O is registered in stages 7X1 through 7X4 and energizes output leads X11, X21, X31 and X41, to which column selector 8CS is responsive to energize column selector lead CSO, thereby enabling column driver 8CO. Drive current for matrix 8MX is provided on lead SEL by selector monopulser 4SEL and is applied through enabled column driver 8CO to column lead CLO. Monopulser 4SEL is energized to provide drive current on lead SEL by the end-of-word signal from counter 4CTR upon complete registration of the alarm identity word in shift register 6SR.

Matrix crosspoint relay 8OA, connected between column lead CLO and row lead RLA, is thus energized. Contact 1 of relay 8OA operates to complete a path for lighting display lamp 5OA1 associated with the remote station from which the alarm derived. This path may be traced from source 501 through operated contact 1 of relay 8OA and lamp 5OA1 to the ground on lead S1. The ground is placed on lead S1 by display selector 5DSL, it will be recalled, responsive to the state of station address counter 5SAC corresponding to the identity of the remote station shown in FIGS. 9 through 15. Display lamp 5OA1 is maintained lighted to provide a visual indication of the alarm condition until extinguished by the operator at the central station through conventional circuitry not shown in the drawing.

*Control mode of operation*

Upon evaluation of an alarm indication displayed at display 5DSP, an operator may initiate appropriate corrective action to alleviate the condition prompting the alarm. For this purpose, a plurality of equipment control circuits 15ECC are provided at each remote station which may be energized via the present system from the central station. For example, assume that upon evaluation of the alarm condition at the remote station shown in FIGS. 9 through 15, indicated by lighted display lamp 5OA1 at display 5DSP, an operator desires to energize the control circuit at the remote station controlled by control relay 15CPAB. The first step taken by the operator is to switch mode switch 3ASC to terminal OPR to terminate the automatic scan mode of operation in the manner described above.

After the automatic scan mode of operation has been terminated, the operator prepares the individual remote station for receiving a control instruction. A preparatory control word comprises the identity of the remote station as the first character thereof and a preparatory command instruction as the second character thereof. The first character is placed in stages 7X1 through 7X7 of shift register 6SR through the operation of one of the first character digit keys at control console 3CON corresponding to the identity of the particular remote station. In the illustrative example herein, therefore, the operator momentarily depresses first character digit key 1, completing a path between lead CLK and lead X5. Accordingly, the next clock pulse on lead CLK is extended over lead X5 through cable XD and OR-gates 714 and 715 to set stages 7X5 and 7X6 of shift register 6SR, stages 7X1 through 7X7 then containing the identity of the remote station shown in FIGS. 9 through 15.

An unused character in the ASCII is chosen for the preparatory command instruction, such as character $DC_1$ (represented by binary 0010001). The preparatory instruction character is placed in stages 6Y1 through 6Y7 through operation of preparatory instruction key 3PREP at control console 3CON. Operation of key 3PREP extends the next clock pulse on lead CLK through OR-gate 302 on lead Y1 and on Y5 through cable YD, setting stages 6Y1 and 6Y5 of shift register 6SR.

The contents of shift register 6SR, particularly the identity of the remote station registered in stages 7X1 through 7X7, may be verified for correctness via shift register lamps SRL and then spilled therefrom to modem 4MOD for transmission to the remote stations by operation of spill key 3SPL. Operation of spill key 3SPL extends source 315 through OR-gate 401 to set flip-flop 4AV. The operation of flip-flop 4AV, clock 4CLK, advance monopulser 4ADV, and counter 4CTR, in serially advancing the word from shift register 6SR over lead OUT to modem 4MOD, is substantially the same as described above in connection with the automatic scan mode of operation. Responsive to the twentieth clock pulse received, indicating that shift register 6SR has been emptied, counter 4CTR provides an end-of-word signal on lead 404 to reset flip-flop 4AV.

The preparatory instruction word transmitted by the central station over channel TC is received and registered in the respective shift registers at each remote station in the same manner as the scan instruction word. Upon complete registration thereof, the station identity gate at each remote station is enabled to determine whether the preparatory instruction word contains the identity of the particular remote station. Thus, at the remote station shown in FIGS. 9 through 15, counter 9CTR provides an end-of-word signal on lead CTR, upon completed registration of the preparatory instruction word in shift register 10SR, to enable station identity gate 11TMG. Inasmuch as stages 11X1 through 11X7 contain the identity of the remote station, each of the output leads therefrom connected to gate 11TMG is energized to provide an identity signal over lead TMG to set station identity flip-flop 9TM. The output of flip-flop 9TM on lead 950 sets flip-flop 9SK1 and is applied over lead TM to instruction gates 10CLG, 10PRG, and 10NSG. The output of flip-flop 9SK1 sets flip-flop 9SK2 to provide an enabling signal on lead SK to enable the transmit portion of modem 9MOD.

The particular combination of outputs of stages 10Y1 through 10Y7 of shift register 10SR, corresponding to a preparatory command instruction registered therein, is connected to preparatory command instruction gate 10PRG, namely the outputs on leads R11, R20, R51, R60 and R70. Each of these leads is energized by the presence of the preparatory command instruction $DC_1$ in shift register 10SR, thereby enabling instruction gate 10PRG to provide a preparatory instruction signal over lead PRG to set flip-flop 9PRP. At this point the particular remote station is prepared to receive the identity of the control circuit to be energized thereat.

The control circuit identity is placed in the system by the operator at the central station through the momentary operation of one of the first character keys and one of the second character keys followed by operation of spill key 3SPL. Assuming, by way of example, that it is desired to energize control relay 15CPAB at the remote station, the operator depresses first character key A and second character key B. Operation of first character key A extends the next clock pulse on lead CLK to lead X1 through OR-gate 308 and to lead X7. The clock pulse on leads X1 and X7 through cable XD sets stages 7X1 and 7X7, respectively, of shift register 6SR to register the first character A in shift register 6SR. The clock pulse extended by operation of the first character key on lead X7 is also directed over lead Y7 through cable YD to set stage 6Y7. Operation of second character key B extends a clock pulse on lead CLK through OR-gate 304 over lead Y2 through cable YD to set stage 6Y2 of shift register 6SR. This completes registration of the second character B in shift register 6SR.

Subsequent operation of spill key 3SPL extends source 315 through OR-gate 401 to set advance flip-flop 4AV. Thus, in the manner described above, the contents of shift register 6SR are spilled over lead OUT to modem 4MOD for transmission to the remote stations over channel TC. Only one remote station, that is the first remote station, has been prepared to respond to the control circuit identity. Thus, when the control circuit identity is registered completely in shift register 10SR, the end-of-word signal from counter 9CTR on lead CTR is directed through gate 937 and OR-gate 943 to set scan flip-flop 9SN. Gate 937 is enabled to direct the end-of-word signal therethrough by the reset condition of match flip-flop 9M and the set condition of flip-flop 9PRP. The set output of flip-flop 9SN enables gate 925 to direct successive clock pulses therethrough to energize scan monopulser 9SCN. Drive flip-flop 9DR is not set by the output of flip-flop 9SN inasmuch as gate 961 is disabled by the set condition of flip-flop 9PRP.

The scan pulses generated by scan monopulser 9SCN on lead SN advance counter 12CTR through its successive states. Match and gate circuit 13MGC compares each successive state of counter 12CTR with the contents of shift register 10SR, looking for a match therebetween. More particularly, the contents of each of stages 10Y1 through 10Y4 and 11X1 through 11X4 are individually compared with the state of respective ones of stages 12CX1 through 12CX4 and 12CY1 through 12CY4 of counter 12CTR via match circuits 13MG1 through 13MG8, respectively. Each of match circuits 13MG1 through 13MG8 may comprise an arrangement of AND gates for this purpose such as shown in match circuit 13MG1. When a match occurs between the contents of shift register 10SR and the state of counter 12CTR, the output of each of match circuits 13MG1 through 13MG8 energizes leads MG1 through MG8, respectively, to direct a match signal through gate 1350, enabled by the set condition of flip-flop 9PRP on lead MTG1, over lead MTG through gate 953 to set match flip-flop 9M. The match signal on lead MTG is also directed through OR-gate 944 to reset scan flip-flop 9SN. The resetting of scan flip-flop 9SN disables gate 925 to terminate the scan pulses on lead SN, the advance of counter 12CTR therefore being halted at the state thereof corresponding to the control circuit identity contained in shift register 10SR.

The output of match flip-flop 9M resets flip-flop 9SK1 through OR-gate 904 and sets alarm flip-flop 9ALM through OR-gate 935. The setting of flip-flop 9ALM sets advance flip-flop 9AV through OR-gate 901 and energizes set monopulser 9SET through OR-gate 923. Set monopulser 9SET provides a set pulse on lead SETR to place shift register 10SR in its reset condition. After a delay provided by delay 9D2, alarm monopulser 9ALM is energized by the set output of flip-flop 9ALM to effect registration of the state of counter 12CTR in shift register 10SR. This is effected in a manner substantially similar to that described above in connection with registration of the alarm test circuit identity in shift register 10SR from counter 12CTR, the state of counter 12CTR being reflected to shift register 10SR over leads CY11 through CY41 and CX11 through CX41.

The contents of shift register 10SR are then advanced out over lead OUTR in the above-described manner through the operation of advance flip-flop 9AV, set by alarm flip-flop 9ALM, and advance monopulser 9ADV. The end-of-word signal on lead CTR from counter 9CTR, upon shift register 10SR being emptied, resets flip-flop 9AV, resets flip-flop 9SK2 through gate 933 and OR-gate 941 to remove the enabling signal from lead SK, and resets alarm flip-flop 9ALM through delay 9D4. Scan flip-flop 9SN is not set in this instance by the signal on lead CTR as it was following transmission of the alarm test circuit identity since gate 942 is disabled by the set condition of flip-flop 9PRP. At this point then, each of the flip-flops in sequence control 9SQC is reset, except flip-flops 9TM, 9M and 9PRP, and counter 12CTR contains the identity of equipment control circuit relay 15CPAB.

The word just transmitted from the remote station on channel RC, indicating the state of counter 12CTR at the remote station, is received and registered in shift register 6SR at the central station. The operator at the central station can thus visually verify, via shift register lamps SRL, that the state of counter 12CTR at the remote station corresponds to the identity of the control circuit which he desires to energize for remote control operation. Assuming that the word in shift register 6SR is the correct control circuit identity, the operator merely depresses spill key 3SPL to return the identity to the remote station as a control instruction, directing the remote station to energize the selected control circuit.

Responsive to the operation of spill key 3SPL, scan control 4SCN at the central station effects readout of the contents of shift register 6SR in the above-described manner. The end-of-word signal from counter 4CTR resets flip-flop 4AV and energizes selector monopulser 4SEL, the output of which through gate 406 and OR-gate 415 energizes reset monopulser 4RES to restore shift register 6SR to its reset condition.

The control circuit identity is thus received and registered a second time in shift register 10SR at the remote station. Upon completed registration thereof in shift register 10SR, counter 9CTR provides an end-of-word signal on lead CTR to reset flip-flops 9STT and 9AV. Inasmuch as the state of counter 12CTR corresponds to the control circuit identity registered in shift register 10SR, an immediate match therebetween obtains and, responsive thereto, match and gate circuit 13MGC provides a match signal through gate 1350 on lead MTG. This second match signal on lead MTG is directed through gate 950, enabled by the set condition of flip-flops 9M and 9PRP, to energize control monopulser 9MAT. Match flip-flop 9M is reset after a delay provided by delay 9D5 by the match signal on lead MTG through gate 954 and OR-gate 956.

Control monopulser 9MAT, upon energization, provides a control drive signal over lead 991 to reset flip-flops 9TM and 9PRP and to place transistor 9Q in a conducting state. An obvious path is completed through transistor 9Q for operating relay 9SC, transfer contact 1 of which removes source 1501 from equipment test circuits 15ETC and extends source 1501 to equipment control circuits 15ECC. The control drive signal on lead 991 is also directed over lead M2 through OR-gate 1201 to matrix drive lead MD. Column selector 14SC and row selector 14RS are responsive to the state of counter 12CTR reflected over cables YS and XS, respectively, to enable column driver 14CA and row driver 14RB (not shown). Accordingly, a path is completed for the control drive signal extended from monopulser 9MAT over lead MD, which path may be traced from lead MD through column driver 14CA over column lead MCA through the coil of relay 14AB (not shown) over row lead MRB (not shown) and through row driver 14RB (not shown) to ground. Matrix crosspoint relay 14AB is energized in the above traced path, contact 2 thereof operating to extend source 1501 therethrough, and through the coil of control circuit relay 15CPAB to ground. Control circuit relay 15CPAB is thus energized to effect operation of control apparatus, not shown in the drawing, to provide the desired corrective action at the remote station.

After a delay provided by delay 12D to ensure that control relay 15CPAB has been operated, the control signal on lead M2 is provided over lead M3 through OR-gate 1216 on counter reset lead CR to place counter 12CTR in its reset condition. Upon termination of the control signal on lead 991, matrix crosspoint relay 14AB releases and transistor 9Q returns to a nonconducting state, releasing relay 9SC.

It will be readily apparent that the control circuit identity contained in counter 12CTR may be returned again to the central station as an indication that the desired corrective action has been taken at the remote station. This may be effected, for example, through the use of alarm flip-flop 9ALM in a manner similar to that described above in connection with the return of the control circuit identity to the central station in response to the first match. An alternative arrangement is shown in the illustrative embodiment herein, however, to permit the operator at the central station to ascertain that the desired corrective action has been taken at the remote station. The operator can, for this purpose, selectively initiate a scan of the equipment test circuits at the particular remote station by manually keying the remote station identity and the scan instruction into the system. Operation of scan instruction key 3SCAN places the scan instruction in shift register 6SR by extending a clock pulse on lead CLK over lead Y5 through OR-gate 610 to set register 6Y5 of shift register 6SR. The remote station identity is placed in shift register 6SR by the operation of the appropriate one of the first character digit keys. Subsequent operation of spill key 3SPL effects readout of shift register 6SR for transmission of the scan instruction word to the remote stations in the manner described above.

When the scan instruction is manually placed in the system by the operator, station address counter 5SAC does not function to enable the corresponding remote station display lamps in display 5DSP. Instead, station address register 5SAR is employed for this purpose. Assume, for example, that the system is in an idle condition, mode switch 3ASC being switched to terminal OPR, and that it is desired to scan the equipment test circuits only at the remote station identified with first character digit key 4. Operation of first character digit key 4, in addition to placing the remote station identity in shift register 6SR, extends a clock pulse over leads KA1 and KA2 to register the remote station identity in station address register 5SAR. Thus the clock pulse on leads KA1 and KA2 is extended through gates 531 and 532, enabled by the reset output of scan flip-flop 4SC on lead SCO, to set stages 5BA1 and 5BA2 of station address register 5SAR. The remote station identity registered in register 5SAR is extended to display selector 5DSL through gates 543 through 548 and OR-gates 521 through 526.

Shift register 6SR is reset in the normal manner upon readout of the contents thereof by a reset pulse on lead RST1 from reset monopulser 4RES. Monopulser 4RES is energized, it will be recalled, by a signal from selector monopulser 4SEL through gate 406 and OR-gate 415, monopulser 4SEL being energized by the end-of-word signal from counter 4CTR. Station address register 5SAR is reset upon completion of the scanning of the remote station by a signal over lead ADR through OR-gates 534, 535 and 536 from address monopulser 4ADR. Address monopulser 4ADR is energized upon completion of a scan, it will be recalled, by a clock pulse through gate 421 which is enabled by end-of-scan monopulser 4EOS responsive to receipt of an end-of-scan word from the remote station. The signal on lead ADR is prevented from advancing the state of station address counter 5SAC by gate 550 which is disabled by the reset condition of scan flip-flop 4SC.

Station address register 5SAR and shift register 6SR may be reset also by the operator through the operation of reset key 3RST which extends source 325 over lead RST through OR-gate 415 to energize reset monopulser 4RES. Monopulser 4RES provides a reset signal over lead RST1 to shift register 6SR. Source 325 is extended directly over lead RST to reset station address register 5SAR upon operation of reset key 3RST. In any event, when the system is returned to the automatic scan mode of operation and scan flip-flop 4SC is set, the output therefrom on lead SC1 is directed through OR-gates 534, 535 and 536 to reset station address register 5SAR.

In the description of the control mode of operation above, it was assumed that counter 12CTR advanced initially to the correct state thereof corresponding to the identity of the control circuit which it is desired to energize. The state of counter 12CTR is transmitted to the central station and registered in shift register 6SR to permit the operator to verify the correctness thereof, it will be recalled, before the control circuit is energized. If the operator determines that the state of counter 12CTR does not correspond to the identity of the control circuit which is to be energized, a clear instruction is transmitted to the remote station to return it to an idle reset condition prior to reinitiation of the control operation. The clear instruction is assumed herein the be the ASCII character $DC_2$ and is placed in shift register 6SR through the operation of clear key 3CLR which extends a clock pulse on lead CLK through OR-gate 304 over lead Y2 to set shift register stage 6Y2 and over lead Y5 through OR-gate 610 to set shift register stage 6Y5. The remote station identity is placed in shift register 6SR in the usual manner through the operation of an appropriate one of the first character digit keys. The clear instruction word is spilled out of shift register 6SR for transmission to the remote station in the manner described above by the operation of spill key 3SPL.

At the remote station the clear instruction word is registered in shift register 10SR. Station identity flip-flop 9TM is still set from the earlier preparatory command instruction word, and the output therefrom on lead TM enables clear instruction gate 10CLG to recognize the clear instruction registered in shift register 10SR and to provide a clear signal on lead CLG. The clear signal on lead CLG is directed through OR-gate 1216 on counter reset lead CR to reset counter 12CTR, through OR-gate 956 to reset match flip-flop 9M, through OR-gate 952 to reset flip-flop 9PRP, through OR-gate 941 to reset flip-flop 9SK2, through OR-gate 903 to reset station identity flip-flop 9TM, and through OR-gate 923 to energize monopulser 9SET. The output of monopulser 9SET on lead SET places shift register 6SR in its reset condition.

What is claimed is:

1. In a system for monitoring and controlling equipment at a plurality of remote stations from a single central station, each said remote station comprising a first plurality of circuits for detecting predetermined equipment conditions to be monitored, a second plurality of circuits individually operable for performing predetermined control functions, scanning and selecting circuitry responsive to first signals for scanning said first plurality of circuits and responsive to second signals for selecting and operating individual one of said second plurality of circuits, and means including said scanning and selecting circuitry responsive to the detection of a predetermined equipment condition by one of said first plurality of circuits for generating a signal identifying said one of said first plurality of circuits.

2. In a system in accordance with claim 1, said scanning and selecting circuitry comprising an array of devices, means for associating each of said devices with a respective one of said first plurality of circuits and a respective one of said second plurality of circuits, first means responsive to said first signals for sequentially energizing each of said devices to scan respective associated ones of said first plurality of circuits, and second means including said first means responsive to said second signals for selectively energizing individual ones of said devices to operate respective associated ones of said second plurality of circuits.

3. In a system in accordance with claim 1, said central station comprising means for generating said first and second signals, means for selectively addressing said first and second signals to individual ones of said remote stations, means for receiving signals generated by said remote stations, and means for recognizing and displaying signals from said remote stations identifying individual ones of said first plurality of circuits detecting a predetermined equipment condition.

4. In a system in accordance with claim 3, said recognizing and displaying means comprising an array of control devices individually associated with corresponding ones of said first plurality of circuits at said remote stations, a plurality of display devices connected to each of said control devices, each said display device connected to one of said control devices being associated with a respective one of said remote stations, means responsive to said identifying signals from one of said remote stations for operating said control device associated with said first plurality circuit identified by said identifying signals, and means responsive to said operated control device for energizing a particular one of said display devices connected thereto associated with said one remote station from which said identifying signals are received.

5. In a monitoring and control system, a central station; a communication link; and a plurality of remote stations each comprising means associated therewith responsive to a particular station address code for connecting said remote station to said communication link, a plurality of test points, a detector, scanning means responsive to a first signal for connecting said detector to individual ones of said test points in sequence, said detector operating in response to the detection of a predetermined condition at a test point connected thereto, signal means responsive to the operation of said detector for providing to said communication link the identity of said test point connected to said detector, a plurality of control points, energization means, and means including said scanning means responsive to a second signal for connecting said energization means selectively to individual ones of said control points.

6. In a monitoring and control system in accordance with claim 5, said central station being connected to said communication link and comprising means for generating station address codes corresponding to individual ones of said remote stations, means for generating said first and second signals, and means for receiving and recording said test point identities from said remote station signal means.

7. A monitoring and control system comprising a plurality of unattended stations, each having a plurality of equipment test circuits to be monitored and a plurality of operable equipment control circuits, an attended station having means for periodically interrogating said unattended stations in sequence, means responsive to the interrogation of each of said unattended stations for monitoring said equipment test circuits at each said unattended station individually in sequence, means operable during the interrogation of each said unattended station for providing indications to said attended station of predetermined conditions of said equipment test circuits being monitored, and control means including said monitoring means for enabling said attended station to selectively operate individual ones of said equipment control circuits.

8. In a monitoring and control system for supervising a plurality of unattended stations from a single attended station, each of said unattended stations having a plurality of equipment test circuits to be monitored and having a plurality of operable equipment control circuits, the combination comprising, scanning circuitry, first means for operating said scanning circuitry to periodically monitor each of said equipment test circuits at each of said unattended stations in a predetermined sequence, second means for operating said scanning circuitry to operate selectively individual ones of said equipment control circuits at said unattended stations, detector means responsive to the presence of a predetermined condition at one of said equipment test circuits during monitoring thereof for deriving from said scanning circuitry the identity of said one equipment test circuit, display means at said attended station, means including said first means for providing to said display means the identity of the particular one of said unattended stations being monitored, and means including said detector means for providing said equipment test circuit identities to said display means.

9. In a monitoring and control system in accordance with claim 8, the combination further comprising means for operating said scanning circuitry to monitor each of said equipment test circuits at a selected one of said unattended stations.

10. A monitoring and control system comprising a single attended station; a communication link; and a plurality of unattended stations, each unattended station comprising an array of control devices, first and second circuits individually associated with each of said control devices, energization means, a counter, means operable for advancing said counter through its successive states, selector circuitry connected to said counter and responsive to each individual state thereof for selecting a corresponding one of said control devices, means responsive to a first signal for operating said counter advancing means to advance said counter to connect said energization means in circuit with individual ones of said first circuits in a predetermined sequence, a shift register, means for registering second circuit identity words in said shift register corresponding to particular states of said counter, means responsive to a second signal for operating said counter advancing means until said counter advances to the particular state thereof corresponding to a second circuit identity word registered in said shift register, and means responsive to said second signal for connecting said energization means in circuit with said second circuit associated with the individual one of said control devices corresponding to said particular state of said counter.

11. A monitoring and control system in accordance with claim 10, said unattended stations each further comprising detector means operative during the advance of said counter responsive to said first signal for stopping said counter when said energization means is connected to one of said first circuits exhibiting a predetermined condition, means responsive to the stopping of said counter by said detector means for registering a first circuit identity word in said shift register, said first circuit identity word corresponding to the state of said counter when stopped, and means for transmitting first circuit identity words registered in said shift register over said communication link to said attended station.

12. A monitoring and control system in accordance with claim 11, said attended station comprising means for generating said first and second signals, means for generating said second circuit identity words, a shift register, means including said shift register for selectively addressing said first and second signals to individual ones of said unattended stations, and means including said shift register for receiving and recording first circuit identity words transmitted over said communication link from said unattended stations.

13. A monitoring and control system in accordance with claim 10 wherein said control devices each comprise a relay having first and second make contacts, means connecting said first make contact of each one of said relays in circuit with said energization means and the individual one of said first circuit means associated with said one relay, and means connecting said second make contact of each one of said relays in circuit with said energization means and the individual one of said second circuit means associated with said one relay.

14. In a monitoring and control system for supervising a plurality of unattended stations from a single attended station, said attended station comprising means for generating first, second and third instructions, means for generating second circuit identity words, a first shift register, means including said first shift register for selectively addressing said first and second instructions to individual ones of said unattended stations, and means incluing said first shift register for receiving and recording signal representations transmitted from said unattended stations; said plurality of unattended stations each comprising an array of control devices, first and second circuits individually associated with each of said control devices, energization means, a counter, means operable for advancing said counter through its successive states, selector circuitry connected to said counter and responsive to each individual state thereof for selecting a correspond ing one of said control devices, means responsive to said first instruction from said attended station for operating said counter advancing means to advance said counter and for connecting said energization means in circuit with individual ones of said first circuits in a predetermined sequence, a second shift register, means for registering said second circuit identity words from said attended station in said second shift register, said second circuit identity words individually corresponding to particular states of said counter, match means responsive to said second instruction for operating said counter advancing means until said counter advances to the particular state thereof corresponding to a second circuit identity word registered in said second shift register, means responsive to said second instruction and operative upon said counter advancing to said particular state for transmitting to said attended station a signal representation of the state of said counter, and means including said match means responsive to said third instruction for connecting said energization means in circuit with said second circuit associated with the individual one of said control devices corresponding to said particular state of said counter.

15. In a monitoring and control system in accordance with claim 14, said unattended stations each further comprising detector means operative during the advance of said counter responsive to said first instruction for stopping said counter when said energization means is connected to one of said first circuits exhibiting a predetermined condition, means responsive to the stopping of said counter by said detector means for registering a first circuit identity word in said second shift register, said first circuit identity word corresponding to the state of said counter when stopped, and means for transmitting first circuit identity words registered in said second shift register to said attended station; and said attended station further comprising means including said first shift register for receiving and recording said first circuit identity words transmitted from said unattended stations.

References Cited

UNITED STATES PATENTS

| | | | |
|---|---|---|---|
| 3,170,150 | 2/1965 | Kelar et al. | 340—151 XR |
| 3,313,160 | 4/1967 | Goldman | 340—151 XR |
| 3,349,374 | 10/1967 | Gabrielson et al. | 340—163 |

DONALD J. YUSKO, *Primary Examiner.*